US006917474B2

(12) United States Patent
Borrelli et al.

(10) Patent No.: US 6,917,474 B2
(45) Date of Patent: Jul. 12, 2005

(54) LENS ARRAY AND METHOD FOR FABRICATING THE LENS ARRAY

(75) Inventors: Nicholas F. Borrelli, Elmira, NY (US);
Robert Sabia, Corning, NY (US);
Dennis W. Smith, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/385,082

(22) Filed: Mar. 10, 2003

(65) Prior Publication Data

US 2003/0174406 A1 Sep. 18, 2003

Related U.S. Application Data

(60) Provisional application No. 60/364,756, filed on Mar. 14, 2002.

(51) Int. Cl.[7] ................................................ G02B 27/10
(52) U.S. Cl. ..................................................... 359/619
(58) Field of Search ............................. 359/619, 620, 359/626, 627, 623, 710; 264/1.32, 1.34; 65/37, 39, 374.13

(56) References Cited

U.S. PATENT DOCUMENTS

| 2,326,012 A | 8/1943 | Dalton ............................ 95/5 |
| 2,422,472 A | 6/1947 | Dalton ........................... 49/92 |
| 2,515,275 A | 7/1950 | Stookey ......................... 49/92 |
| 2,515,936 A | 7/1950 | Houston ......................... 49/92 |
| 2,515,938 A | 7/1950 | Stookey ......................... 49/92 |
| 2,515,942 A | 7/1950 | Stookey ......................... 49/92 |
| 2,515,943 A | 7/1950 | Stookey ......................... 49/88 |
| 4,518,222 A | 5/1985 | Borrelli et al. ............. 350/167 |
| 4,572,611 A | 2/1986 | Bellman et al. ............ 350/167 |
| 5,062,877 A | 11/1991 | Borrelli et al. ............ 65/30.13 |
| 6,193,801 B1 | 2/2001 | Hooker et al. ............. 118/500 |
| 6,587,618 B2 * | 7/2003 | Raguin et al. ................ 385/33 |

FOREIGN PATENT DOCUMENTS

| EP | 0 133 788 A2 | 3/1985 |
| EP | 0 431 281 A1 | 6/1991 |
| EP | 1 041 405 A1 | 10/2000 |
| GB | 2 077 939 | 12/1981 |

* cited by examiner

Primary Examiner—Georgia Epps
Assistant Examiner—Alicia M Harrington
(74) Attorney, Agent, or Firm—Timothy M. Schaeberle

(57) ABSTRACT

A lens array and a method for fabricating a lens array that is relatively flat and has useful lenses with relatively uniform sag heights are described herein. In one embodiment, the lens array includes a one-dimensional array of useful lens and two sacrificial lens each of which is formed next to an end of a row of the useful lenses. In another embodiment, the lens array includes a two-dimensional array of useful lens and a plurality of perimeter sacrificial lens each of which is formed next to an end of a row or a column of the useful lenses. In yet another embodiment, the lens array includes an array of useful lenses and a glass region (including possibly a glass matrix) located within a opal border and outside a opal region that surrounds the useful lenses.

21 Claims, 23 Drawing Sheets

LENS ARRAY AND METHOD FOR FABRICATING THE LENS ARRAY

CLAIMING BENEFIT OF PRIOR FILED PROVISIONAL APPLICATION

This application claims the benefit of U.S. Provisional Application Ser. No. 60/364,756 filed on Mar. 14, 2002.

BACKGROUND OF THE INVENTION

1. Field of the Invention

The present invention relates in general to the photonics field and, in particular, to a lens array and a method for fabricating the lens array that is relatively flat and has useful lenses with relatively uniform sag heights.

2. Description of Related Art

In the photonics field, one of the most significant design challenges involves the development of a new lens array which can be coupled to a fiber array to form a "near" ideal collimator array. Even though it is theoretically impossible to make a truly ideal collimator array, one can come very close if they can ensure that certain optical properties of a lens array are consistent for each of the lens in the lens array. To help ensure the consistency of these optical properties, one can make a lens array in accordance with the present invention that is relatively flat and has useful lenses with relatively uniform sag heights.

Referring to FIG. 1, there is illustrated a cross-sectional side view of an ideal collimator array 100 which includes an ideal fiber array 110 that is optically coupled to an ideal lens array 120 (shown in this example as a 1×8 lens array). The collimator array 100 has a series of collimators 100a–100h each of which includes an optical fiber 110a–110h and a lens 120a–120h that are optically coupled to one another. The function of a collimator 100a (for example) is to generate parallel rays of light 130a having a desired spot size by using the lens 120a to broaden a ray of light 140a exiting the optical fiber 110a. To obtain the desired spot size of the parallel rays of light 130a–130h for each of the collimators 100a–100h, several parameters need to be constant in each collimator 100a–100h. These parameter's include: (1) the distance ("d") between each optical fiber 110a–110h and each lens 120a–120h; (2) the distance to beam waste ("DBW"); and (3) the mode field diameter ("MFD"). The ideal collimator array 100 in FIG. 1 shows these parameters and the equations below defines these parameters as follows:

$$d = \text{Lenses surface to fiber distance.} \quad (1)$$

DBW=Distance to beam waste $$DBW = \frac{f\{z_0^2(1-\psi_1 t') + [t' + d(1-\psi_1 t')][f(1-\psi_2 t') - d]\}}{\{z_0^2 + [f(1-\psi_2 t') - d]^2\}} \quad (2)$$

where:
 t=plate thickness.
 $s_1$=back-side sag height.
 $s_2$=front-side sag height.
 D=Lenses diameter.

$$c_i = \frac{2s_i}{(D/2)^2 + s_i^2} \quad \text{curvature of lenses surface.}$$

curvature of lenses surface.
 $n_l$=Index of refraction of lenses material.
 $\omega_0$=fiber mode diameter.

$$z_0 = \frac{\pi}{\lambda}\omega_0^2 \quad \text{Rayleigh range.}$$

Rayleigh range.
 λ=wavelength of light.

$$\phi_i = c_i \Delta n = c_i(n_l - 1)$$

$$\frac{1}{f} = \phi_1 + \phi_2 - \phi_1\phi_2 t'$$

$$f = \text{thick lenses focal length}, \quad t' = t/n_l$$

f=thick lenses focal length, t'=t/$n_l$
 $\psi_i = 1 - \phi_i t'$
 MFD=Mode field diameter $$MFD = \quad (3)$$

$$\omega = \sqrt{\left(\frac{\lambda}{\pi}\right)\frac{(f\psi_1 - DBW)^2 z_0^2 + [ft' + f(d\psi_1 + DBW\psi_2) - dDBW]^2}{z_0 f(t' + f\psi_1\psi_2)}}$$

\* These equations are based on a lens array that has bi-convex lenses. However, it should be understood that the lens array of the present invention can have bi-convex lenses, plano-convex lenses or equi-convex lenses.

Referring to these equations and the ideal collimator array 100 shown in FIG. 1, one can see that each lens 120a–120h in the lens array 120 must have the same configuration in order to have consistent parameters "d", "DBW" and "MFD". This assumes the fiber array 110 and lens array 120 are aligned to one another and that the fiber array 100 is able to hold the fibers 120a–120h a constant "d" away from each lens 120a–120h.

Unfortunately, the traditional collimator 200 that has a lens array 220 produced from a photosensitive glass plate suffers from several problems which make it far from being an "ideal" lens array 120. Today it is well known that a lens array can be made from a photosensitive glass plate. In fact, scientists at Corning Incorporated the assignee of the present invention have developed and patented a photosensitive glass plate known as FOTOFORM® glass and a process known as the SMILE® process which can be used to form a lens array. The SMILE® process subjects the FOTO-FORM® glass to an ultraviolet light exposure step, a heat treatment step and an ion exchange step in order to turn the FOTOFORM® glass into the lens array. A detailed discussion about the SMILE® process is provided in U.S. Pat. Nos. 4,572,611, 4,518,222 and 5,062,877 the contents of which are incorporated herein by reference. And, a detailed discussion about the FOTOFORM® glass is provided in U.S. Pat. Nos. 2,326,012, 2,422,472, 2,515,936, 2,515,938, 2,515,275, 2,515,942 and 2,515,943 the contents of which are incorporated herein by reference. An example of a traditional collimator array 200 that includes a lens array 220 that was fabricated from FOTOFORM® glass which was subjected to the SMILE® process is described below with respect to FIGS. 2A and 2B.

Referring to FIGS. 2A–2B, there are respectively illustrated a cross-sectional side view of the traditional collimator array 200 and a top view of the traditional lens array 220 (shown in this example as a 3×8 lens array). Like the ideal collimator array 100, the traditional array 200 includes a fiber array 210 holding optical fibers 220a–220h (only eight shown) that are optically coupled to the lenses 220a–220h in the lens array 220. The lenses 220a–220h are not close to having the same configurations and constant parameters "d", "DBW" and "MFD" that are needed to form an ideal lens array 110. The traditional lens array 220 suffers from several problems including:

Non-uniform sag heights $s_1$ and $s_2$*.

A warped lens array 220**.

For large N×M lens arrays where N and M>>1, non-uniform shrinkage across the lens array can result in non-uniform pith values (pitch=distance between two lens center points).

* Note that the outer lenses 220a and 220h have sag heights $s_1$ and $s_2$ that are higher than the sag heights $s_1$ and $s_2$ of the inner lenses 220b–220g.
** An explanation as to why the traditional lens array 220 is warped is described below with respect to the lens array of the present invention.

As can be seen, the traditional lens array 220 does not look like the ideal lens array 120 and as such the traditional lens array 220 does not function like the ideal lens array 120. This is because, all of the lenses 220a–220h are not uniform and do not have consistent optical parameters "d", "DBW" and "MFD" like the lenses 120a–120h in the ideal lens array 120. And, since the lens array 220 is warped, the "d" dimensions are not the same between the optical fibers 210a–210h and the lenses 220a–220h. Accordingly, there is and has been a need for a lens array that does not suffer from the aforementioned shortcomings and other shortcomings of the traditional lens array. These needs and other needs are satisfied by the lens array and method of the present invention.

BRIEF DESCRIPTION OF THE INVENTION

The present invention includes a lens array and a method for fabricating a lens array that addresses the non-uniform sag heights of the lenses and/or the warpage problems in the traditional lens array. In one embodiment, the lens array includes a one-dimensional array of useful lens and two sacrificial lens each of which is formed next to an end of a row of the useful lenses to help maintain relatively uniform sag heights across the useful lenses. In another embodiment, the lens array includes a two-dimensional array of useful lens and a plurality of perimeter lens each of which is formed next to an end of a row or a column of the useful lenses to help maintain relatively uniform sag heights across the useful lens. In yet another embodiment, the lens array includes an array of useful lenses and a glass region (including possibly a glass matrix) located within a opal border and outside a opal region that surrounds the useful lenses to help minimize warpage of the lens array. In fact, there are many different embodiments of the lens array described herein that incorporate one or more of the aforementioned features.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE DRAWINGS

Figure 1:
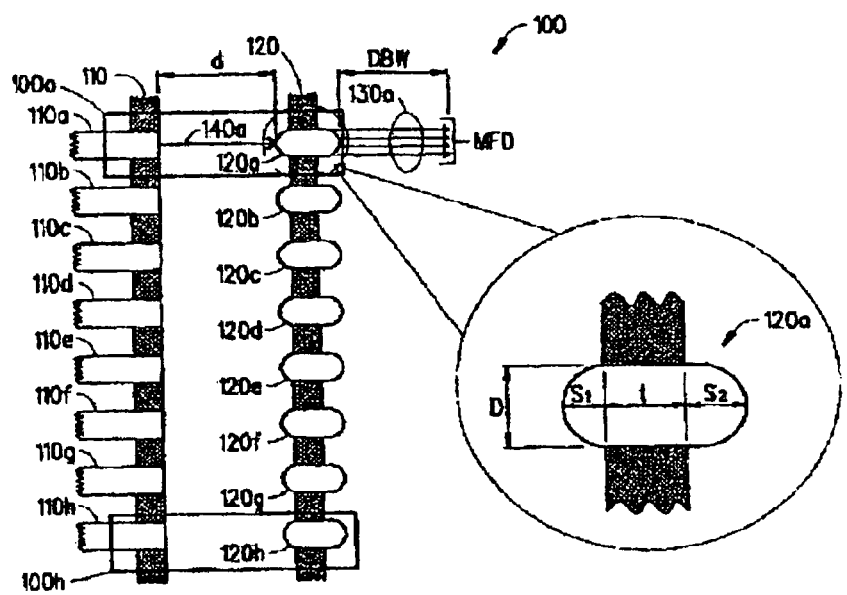
FIG. 1 is an illustration of a cross-sectional side view of an "ideal" collimator array.
Figure 3:
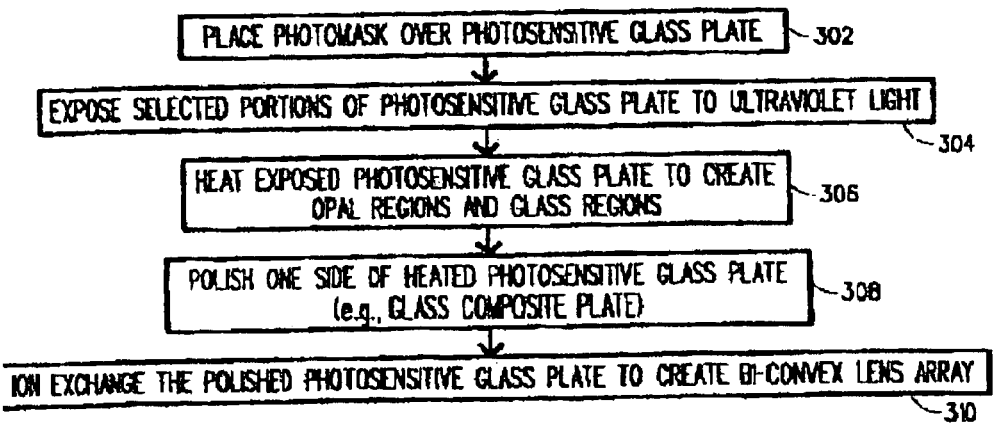
FIG. 3 is a flowchart illustrating the steps of a preferred method for fabricating a bi-convex lens array in accordance with the present invention.

Referring to FIGS. 3–18, there are disclosed different embodiments of a lens array 400, 600, 800 . . . 1800 and preferred methods 300, 500 and 700 for fabricating the different embodiments of the lens array 400, 600, 800 . . . 1800 in accordance with the present invention. To better describe the present invention a detailed discussion about methods 300, 500 and 700 for fabricating different embodiments of the lens array 400, 600 and 800 (see FIGS. 3–8) is provided before a detailed discussion about the different configurations of the remaining embodiments of the lens array 900, 1000 . . . 1800 (see FIGS. 9–18).

Referring to FIGS. 3 and 4A–4G, there are respectively illustrated a flowchart of the preferred method 300 for making a bi-convex lens array 400 and various cross-sectional side views and top views of bi-convex lens array 400 at different steps in the preferred method 300. Beginning at step 302, a photomask 402 is placed in contact with a photosensitive glass plate 404 (see FIG. 4A). In the preferred embodiment, the photosensitive glass plate 404 is a photonucleable, crystallizable lithium-silicate glass body marketed by Corning Incorporated under the brand name of FOTOFORM® glass. The photosensitive glass plate 404 is ground and polished to make a suitably sized substrate that is going to be one or more lens arrays 400 (only one lens array 400 is shown). Typical dimensions of the photosensitive glass plate 404 are 4"×4"×0.160". The length and width can be varied significantly depending on the application but the thickness preferably should not be less than about 0.075" or greater than about 0.25". The preferred photosensitive glass plate 404 needs to be protected, at all stages prior to the heat treatment step 306, from ambient ultraviolet exposure (e.g., sunlight, unfiltered artificial light) to prevent trace amounts of opal formation in areas where lenses are desired in the lens array 400.

The contact can be an air interface 403 between the photomask 402 and the photosensitive glass plate 404. Instead of having the air interface 403, an oil closely matching the index of glass such as glycerin can be used as a medium between the photomask 402 and the photosensitive glass plate 404 to help eliminate the air gap 403 and the resulting reflection and/or scattering of light that can result from the air gap 403.

Figure 4A:
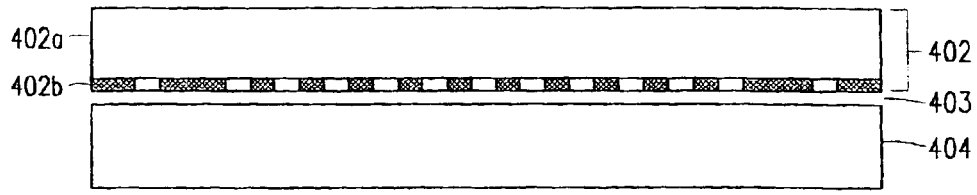
FIGS. 4A–4G illustrates cross-sectional side views and top views of the bi-convex lens array at different steps in the method shown in FIG. 3.
Figure 4B:
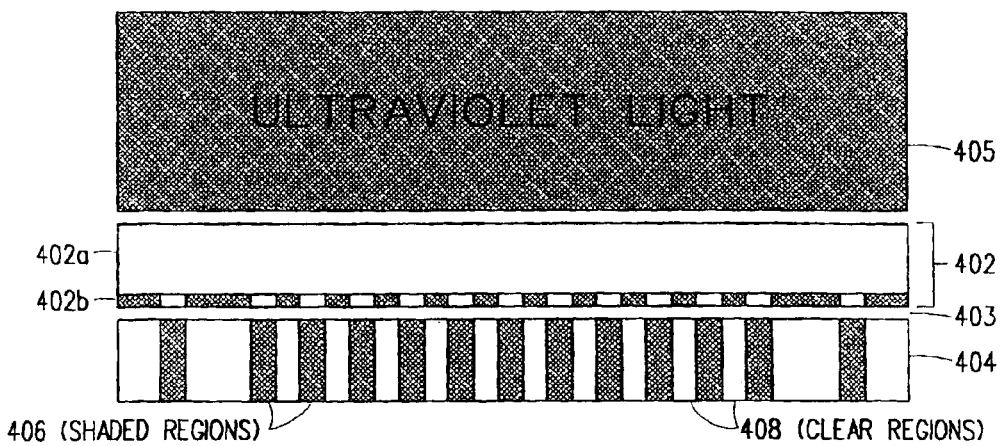

At step 304, the photomask 402 and selected regions of the photosensitive glass plate 404 are exposed to an ultraviolet light 405 (see FIG. 4B). In the preferred embodiment, the photomask 402 is a chrome-on-quartz photomask 402 which is used to control the exposure pattern on the photosensitive glass plate 404. The chrome-on-quartz photomask 402 includes a quartz substrate 402a and a chromium layer 402b. The chrome in the chromium layer 402b of the photomask 402 is absent where opal regions 406 (shown as shaded regions) are desired in the photosensitive glass plate 404. In particular, each opal region 406 is a composite of a glass phase and a lithium metasilicate nano-crystalline phase where the later is about 20% by volume of the composite. And, the chrome in the chromium layer 402b of the photomask 402 is present where glass regions 408 (shown as clear regions) are desired in the photosensitive glass plate 404. Typically the orientation of the photosensitive glass plate 404 is maintained between the exposure step 304 and the heat treatment step 306.

The exposure step 304 can be performed by any method that is capable of producing an ultraviolet light with sufficient energy to nucleate the opal phase (future opal regions 406) in the photosensitive glass plate 404 and with sufficient collimation so that the exposure is well defined through the photosensitive glass plate 404. For example, a collimated 1000 watt Hg/Xe arc source can be used to expose the photosensitive glass plate 404. In this example, the output beam is approximately 10" in diameter which is more than sufficient for a 5"×5" photomask 402. And, the intensity of the ultraviolet light is in the 5–10 mw/cm$_2$ range with an exposure of 240–400 nm (most preferable 300–350 nm) for 12 minutes, where deviations from this range result in longer exposure times. After the exposure step 304, the photomask 402 is separated from the exposed photosensitive glass plate 404. If needed, the exposed photosensitive glass plate 404 is washed with soap and water to remove dust, contaminants, residue etc.

At step 306, the exposed photosensitive glass plate 404 is heated to form therein the opal regions 406 (shown as shaded regions) and the glass regions 408 (shown as clear regions). In the preferred embodiment, the heat treatment step 306 is done in a furnace with the exposed photosensitive glass plate 404 placed in a covered stainless steel box with flowing dry nitrogen. In particular, the exposed photosensitive glass plate 404 is placed on a former or flat plate with the exposed face of the exposed photosensitive glass plate 404 facing up. The former can be any glass, ceramic or glass-ceramic material which the exposed photosensitive glass plate 404 does not fuse to during the heat treatment step 306 and which does not deform during the heat treatment step 306. Powdered $Al_2O_3$ (for example) can be spread on the former to act as a parting agent. A typical heat treat schedule is as follows:

460° C./hr to 480° C.
180° C./hr to 600° C.
Hold@600° C. for 40 minutes.
Cool furnace rate.

Figure 4C:
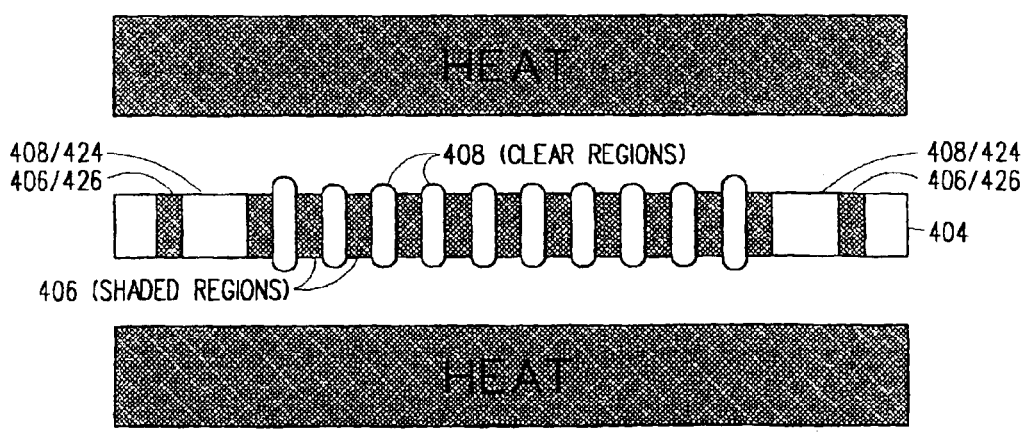

During the heating step 306, the opal regions 406 shrink considerably more than the glass regions 408 in the photosensitive glass plate 404 (see FIG. 4C). After completing steps 302, 304 and 306, the heated photosensitive glass plate 404 resembles a thermally produced lens array 400 which is basically a glass composite plate.

In the event, the photosensitive glass plate 404 is FOTOFORM® glass 404 then the thermally produced lens array 400 could be produced by exposing the FOTOFORM® glass 404 to ultraviolet light with wavelengths preferably between 240–400 nm (most preferable 300–350 nm)nm and subsequently heat treating the exposed FOTOFORM® glass 404 to form the opal regions 406 and the glass regions 408. The opal regions 406 have ceramic particles and as such they have a greater density than the glass regions 408. The mechanism for formation of nuclei that enables the growth of the ceramic particles in the opal regions 406 starts when cerium III ($Ce^{3+}$) in the FOTOFORM® glass 404 absorbs the ultraviolet light and converts to cerium IV ($Ce^{4+}$) which results in the release of an electron. The electron is absorbed by metal ions, for example silver ions ($Ag^{1+}$), in the FOTOFORM® glass 404 and converts these ions to metal (e.g., $Ag^0$). Alternative metal ions include gold, copper and palladium. A more detailed discussion about the composition of FOTOFORM® glass is provided in U.S. Pat. Nos. 2,326,012, 2,422,472, 2,515,936, 2,515,938, 2,515,275, 2,515,942 and 2,515,943 the contents of which are incorporated herein by reference.

Figure 4D:
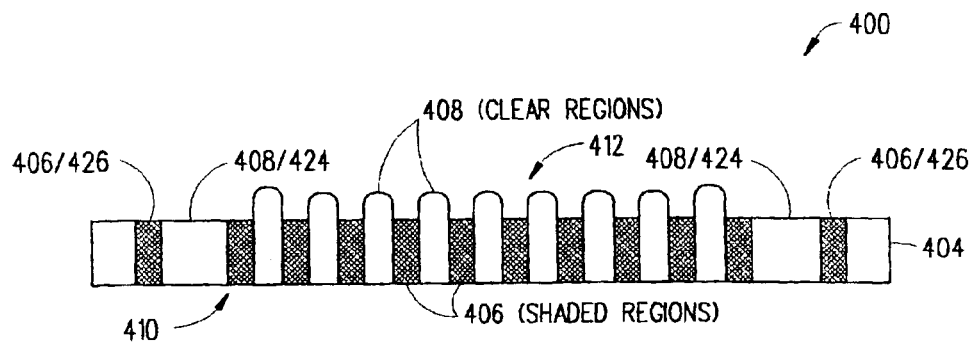
Figure 4E:
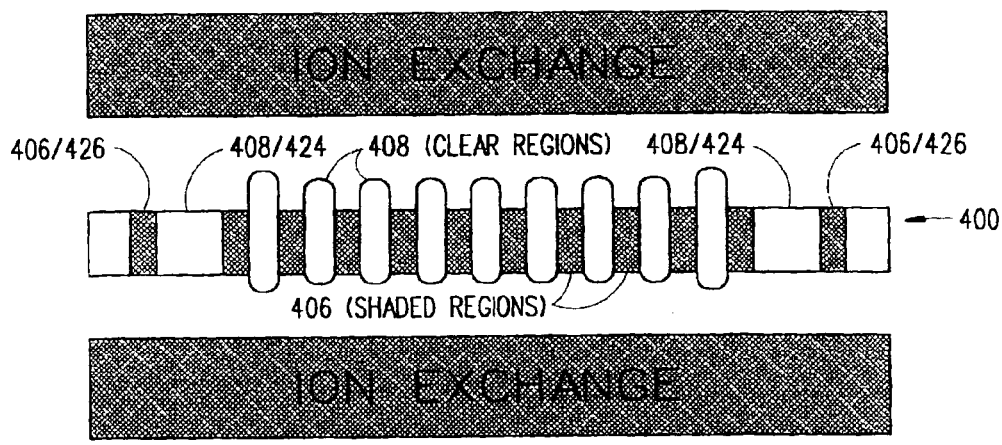

At step 308, the side 410 of the thermally produced lens array 400 that is placed on the furnace or former is polished (see FIG. 4D). The side 410 is polished smooth because the glass regions 408 extending out past the opal regions 406 become "damaged" or "deformed" when they contact the furnace or the former during the heat treatment step 306. Of course, the optical properties of the "damaged" or "deformed" glass regions 408 are not as desirable as the optical properties of the glass regions 408 extending from the other side 412 of the thermally produced lens array 400.

Figure 4F:
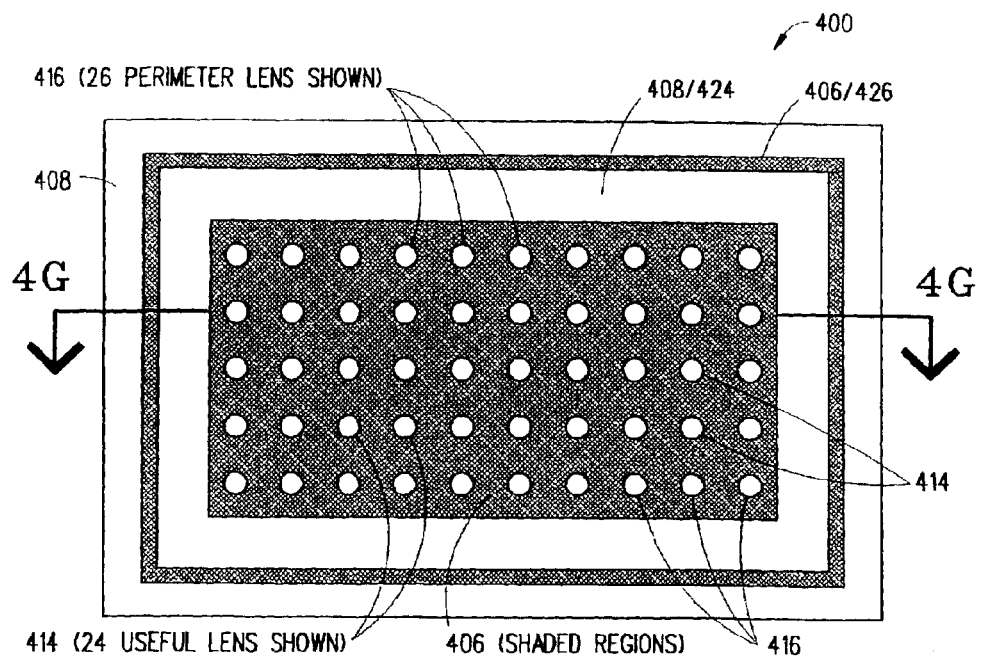
Figure 4G:
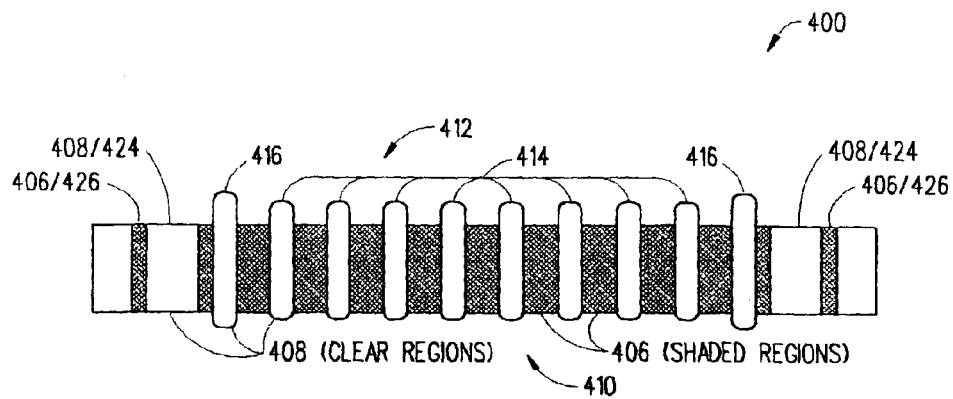
Figure 5:
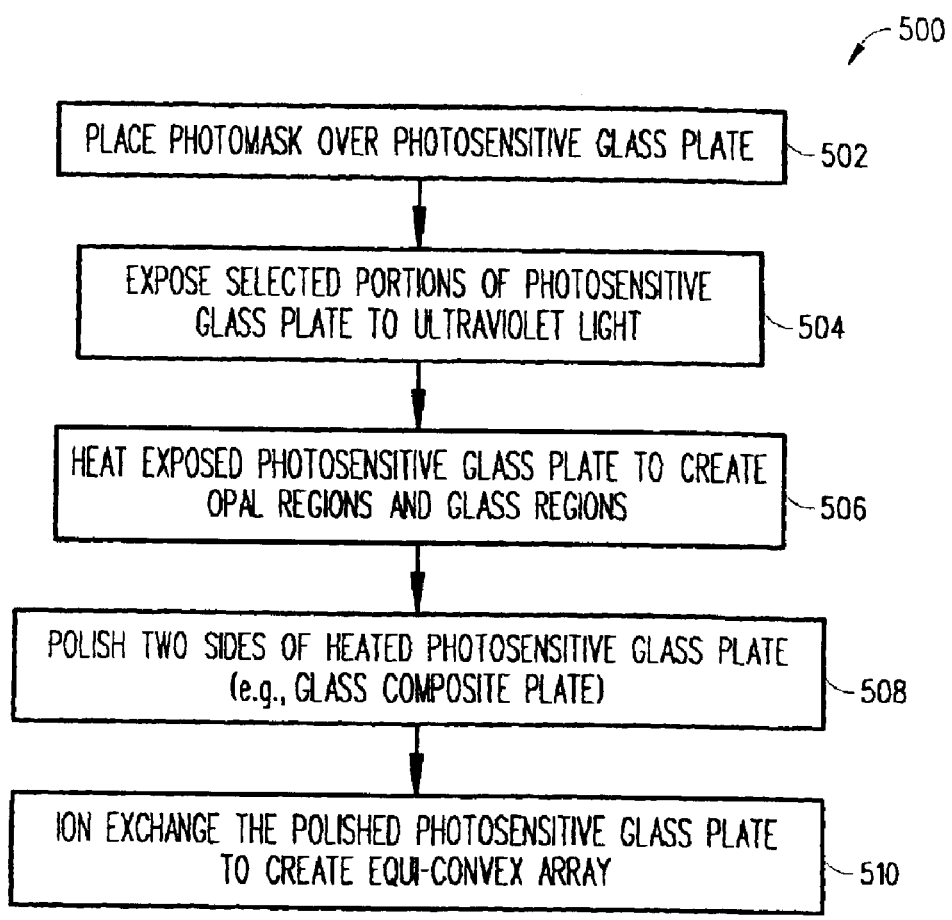
FIG. 5 is a flowchart illustrating the steps of a preferred method for fabricating an equi-convex lens array in accordance with the present invention.

At step 310, the polished lens array 400 undergoes an ion exchange process (see FIG. 4E) to create the lens array 400 (see FIGS. 4F and 4G). A typical ion exchange step 310 could be performed by immersing the polished lens array 400 for a predetermined amount of time in a $KNO_3$ molten salt bath at 500° C. As shown in FIGS. 4F and 4G, the lens array 400 includes an array of useful bi-convex lens 414 that are formed in predetermined glass regions 408. As can be seen, the ion exchange step 310 produces useful lenses 414 on side 410 which was polished flat in the polishing step 308 (see FIG. 4D). The useful lenses 414 on side 412 are going to be a little higher than the useful lenses 414 on side 410, because there were no convex lenses 414 on side 410 after the polishing step 308. For example, the useful lenses 414 on side 412 can be 35 microns high and the useful lenses 414 on side 410 can be 25 microns high. The optical properties of the array of useful lens 414 are enhanced by the ion exchange step 310 which generates additional sag on the thermally produced lenses 414. Sag is the parameter that controls the radius of curvature of the useful lenses 414 (see $s_1$ or $s_2$ in FIG. 1). As such, the magnitude of the sag directly effects the light gathering power of each useful lens 414.

Figure 2A:
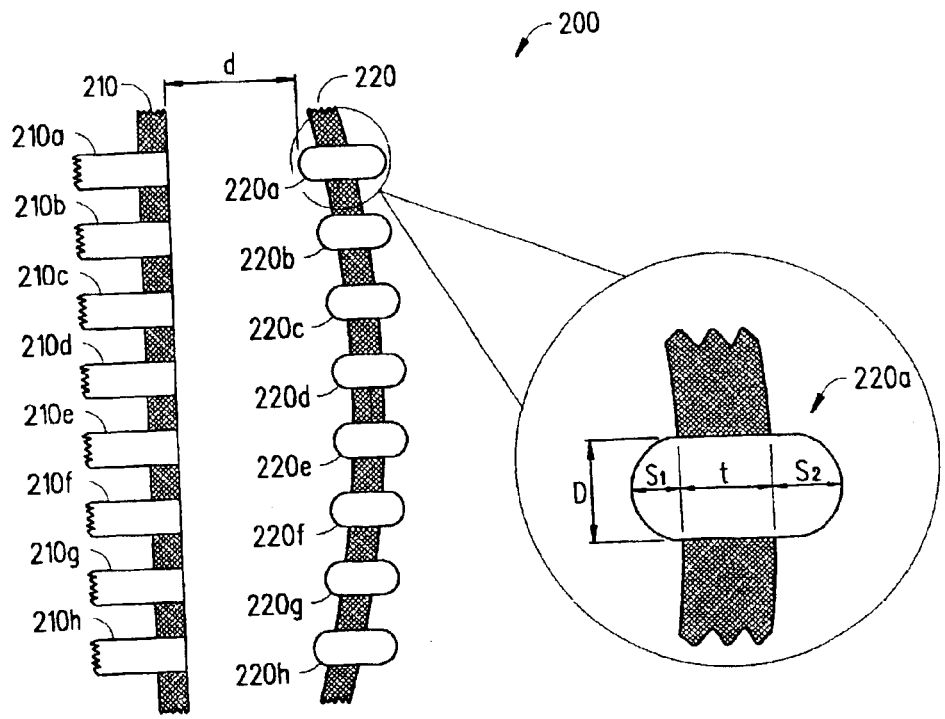
FIGS. 2A–2B (PRIOR ART) respectively illustrates a cross-sectional side view of a traditional collimator array and a top view of a traditional lens array.
Figure 2B:
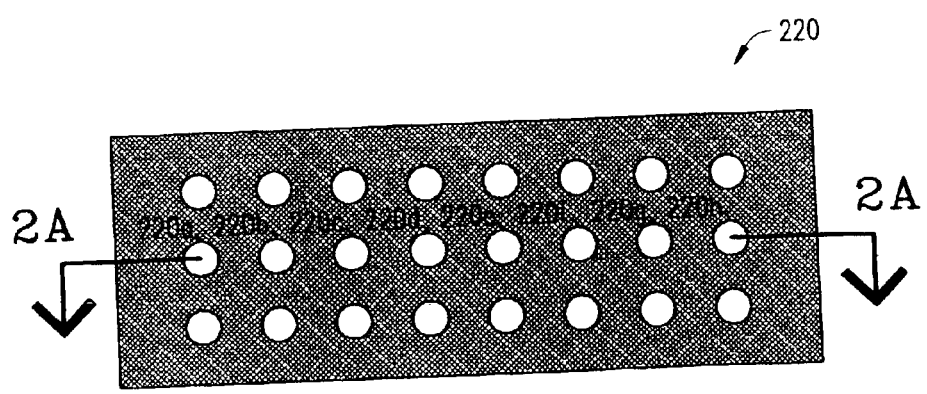

The lens array 400 also includes a series of perimeter lens 416 that surround the useful bi-convex lenses 414 (see FIGS. 4F and 4G). The perimeter lenses 416 are formed in predetermined glass regions 408 but are not used in the lens array 400 to collimate light from optical fibers (not shown). The addition of the perimeter lenses 416 indirectly enhances the optical properties of the useful lenses 414 by helping to maintain relatively uniform sag heights across the useful bi-convex lenses 414. In particular, without the perimeter lenses 416, the outer useful lenses 414 would have higher sag heights than the inner useful lenses 414. Again, the difference in sag heights is one of the problems with the traditional lens array 220 where the outer lenses 220a and 220h are higher than the inner lenses 220b–220g (see FIGS. 2A–2B). As can be seen in FIG. 4G, the perimeter lenses 416 have higher sag heights than the useful lenses 414 and all of the useful lenses 414 have uniform sag heights.

In the event, the lens array 400 had only one row of useful lens 414 instead of a two-dimensional array of useful lens 414, then two sacrificial lenses could be added at each end of the row of the useful lenses 414. In other words, a one-dimensional lens array would not need perimeter lenses 416 but instead would have two sacrificial lenses at each end of the row of useful lenses 414. The sacrificial lenses like the perimeter lenses 416 would help maintain relatively uniform sag heights across the useful lenses 414. This situation is described in greater detail below with respect to lens array 1400, 1500 and 1600 (see FIGS. 14–16).

The lens array 400 also includes an additional glass region 408 shown as glass region 424 which is not one of the useful lenses 414 or perimeter lenses 416. The glass region 424 is located within a opal border 426 and outside the opal region 406 surrounding the useful lenses 414 and the perimeter lenses 416. The opal border 426 is shown as a frame around the lens array 400. The addition of the glass region 424 and the opal border 426 helps minimize the warpage of the lens array 400 (see FIG. 4G). Otherwise, the lens array 400 without the glass region 424 would likely warp after the ion exchange step 310 (compare to traditional lens array 200 in FIGS. 2A–2B).

The traditional bi-convex lens array 220 is warped because the non-uniform structural stresses that were introduced while lapping and polishing one side of the traditional lens array 220 to remove damaged lenses causes the warpage when the polished traditional lens array 220 is subjected to an ion exchange step. In other words, relief of the non-uniform structural stresses that exist on one side of the traditional lens array 220 happens during the ion exchange step which results in the warpage of the traditional bi-convex lens array 220. In contrast, the bi-convex lens array 400 of the present invention has the glass region 424 and the opal border 426 which act to minimize warpage during the ion exchange step 310. In other words, as the stress in the glass region 424 of the lens array 400 relax during ion exchange, the opal border 426 adds stiffness to the overall lens array 400 and prevents extreme warpage, thus minimizing the detrimental effect during stress relaxation.

Referring to FIGS. 5 and 6A–6G, there are respectively illustrated a flowchart of the preferred method 500 for making an equi-convex lens array 600 and various cross-sectional side views and top views of equi-convex lens array 600 at different steps in the preferred method 500. To avoid repetition, some of the details about the preferred photosensitive glass plate and how this plate can be used to make the equi-convex lens array 600 are not described in detail below since they are the same as described above with respect to the bi-convex lens array 400.

Figure 6A:
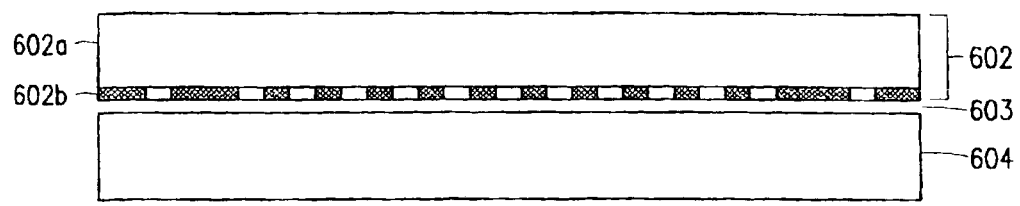
FIGS. 6A–6G illustrates cross-sectional side views and top views of the equi-convex lens array at different steps in the method shown in FIG. 5.

Beginning at step 502, a photomask 602 is placed in contact with a photosensitive glass plate 604 (see FIG. 6A). The contact can be an air interface 603 between the photomask 602 and the photosensitive glass plate 604. Instead of having the air interface 603, an oil closely matching the index of glass such as glycerin can be used as a medium between the photomask 602 and the photosensitive glass plate 604 to help eliminate the air gap 603 and the resulting reflection and/or scattering of light that can result from the air gap 603.

Figure 6B:
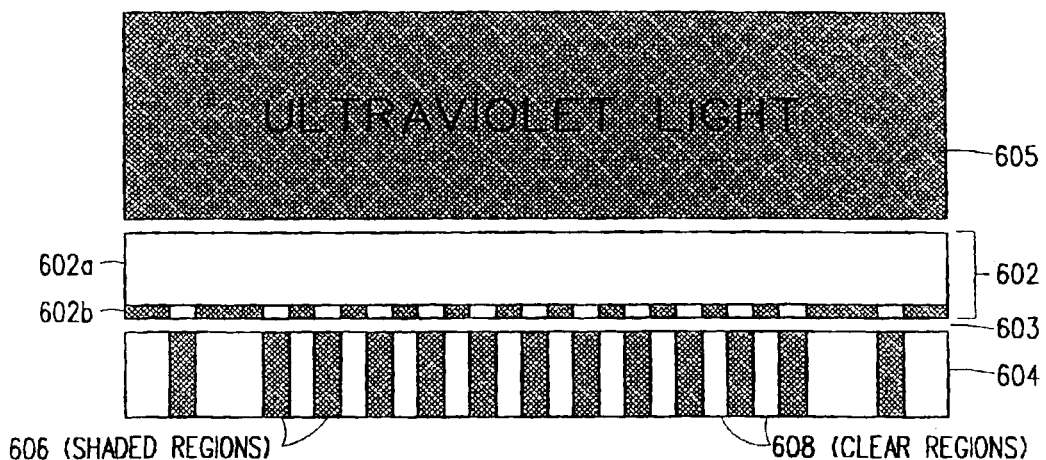
Figure 6C:
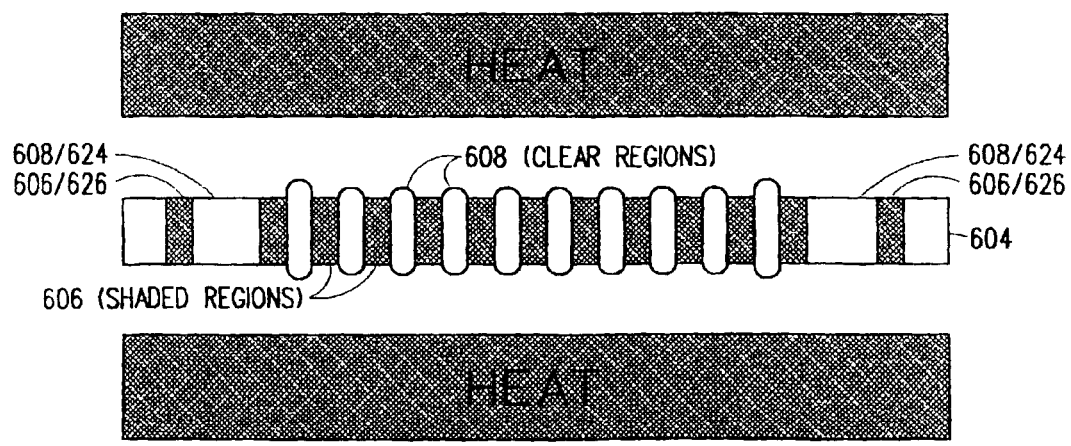
Figure 6D:
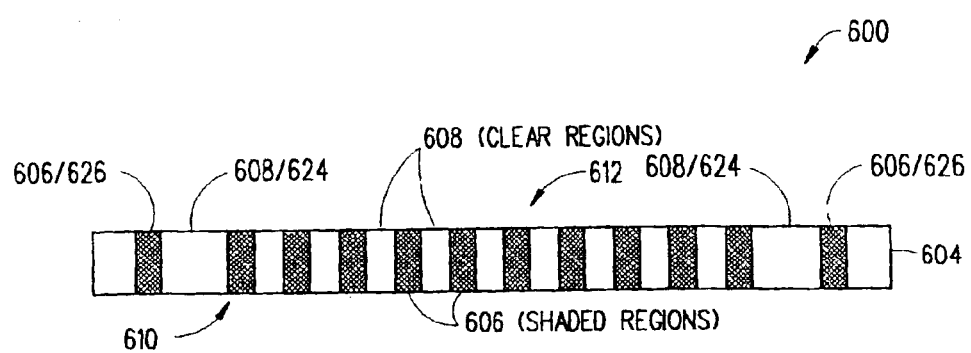

At step 504, the photomask 602 and selected regions of the photosensitive glass plate 604 are exposed to an ultraviolet light 605 (see FIG. 6B). Like the aforementioned photomask 402, the photomask 602 can be a chrome-on-quartz photomask 602 which includes a quartz substrate 602a and a chromium layer 602b. The chrome in the chromium layer 602b of the photomask 602 is absent where opal regions 606 (shown as shaded regions) are desired in the photosensitive glass plate 604. And, the chrome in the chromium layer 602b of the photomask 602 is present where glass regions 608 (shown as clear regions) are desired in the photosensitive glass plate 604.

The exposure step 504 can be performed by any method that is capable of producing an ultraviolet light with sufficient energy to nucleate the opal phase (future opal regions 606) in the photosensitive glass plate 604 and with sufficient collimation so that the exposure is well defined through the photosensitive glass plate 604. After the exposure step 504, the photomask 602 is separated from the exposed photosensitive glass plate 604. If needed, the exposed photosensitive glass plate 604 is washed with soap and water to remove dust, contaminants, residue etc.

At step 506, the exposed photosensitive glass plate 604 is heated to form therein the opal regions 606 (shown as shaded regions) and the glass regions 608 (shown as clear regions). Like the aforementioned heat treatment step 406, the heat treatment step 506 can be done in a furnace with the exposed photosensitive glass plate 604 placed in a covered stainless steel box with flowing dry nitrogen. During the heating step 506, the opal regions 606 shrink considerably more than the glass regions 608 in the photosensitive glass plate 604 (see FIG. 6C). After completing steps 502, 504 and 506, the heated photosensitive glass plate 604 resembles a thermally produced lens array 600 which is basically a glass composite plate.

Figure 6E:
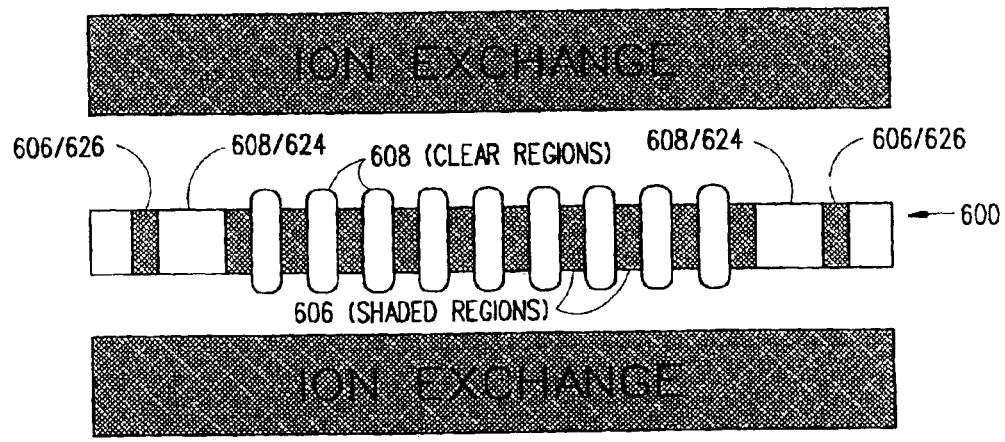
Figure 6F:
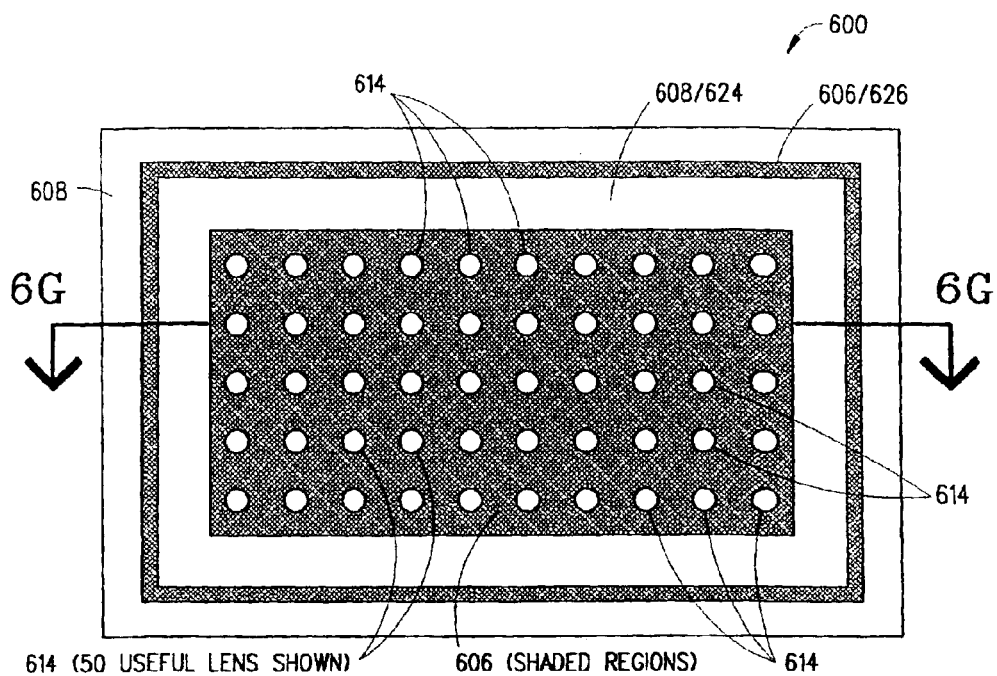
Figure 6G:
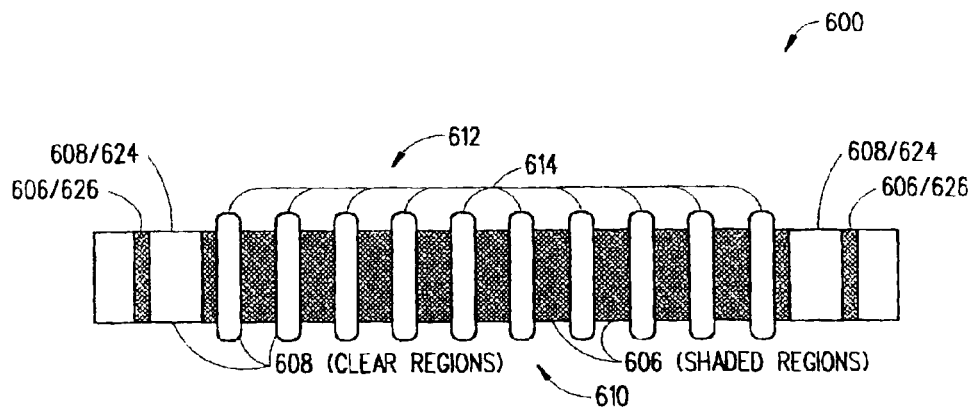
Figure 7:
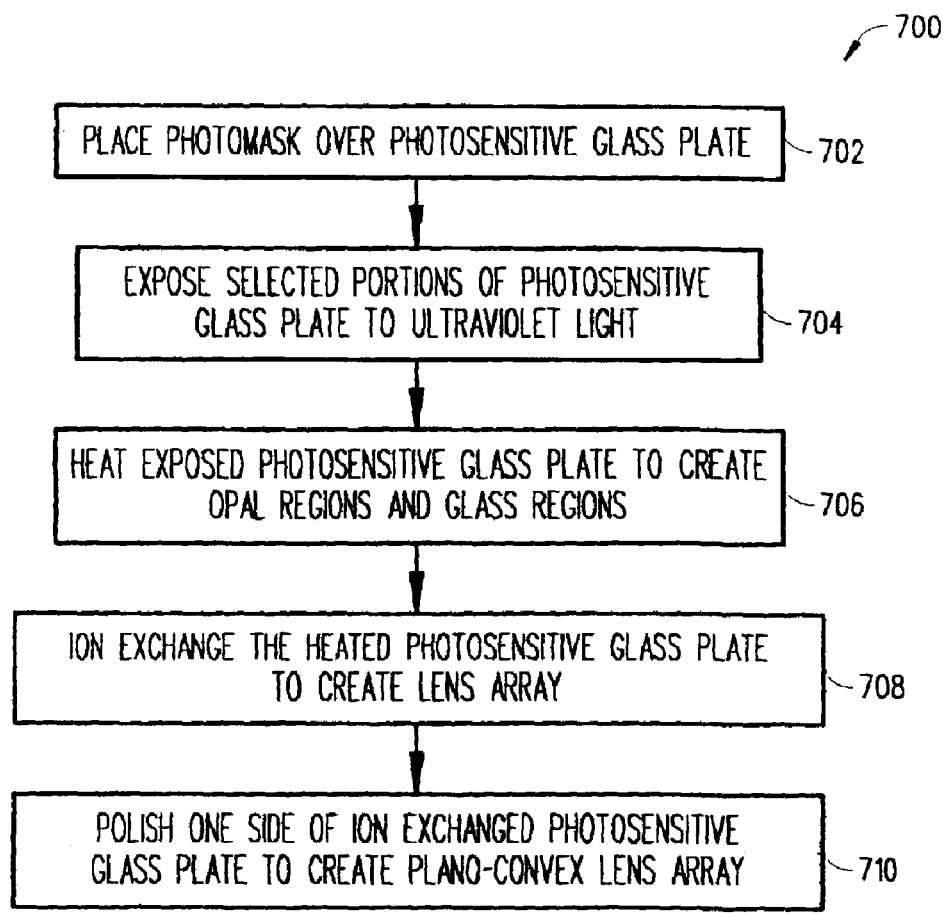
FIG. 7 is a flowchart illustrating the steps of a preferred method for fabricating a piano-convex lens array in accordance with the present invention.

At step 508, both sides 610 and 612 of the thermally produced lens array 600 are polished (see FIG. 6E). Then, at step 510, the polished lens array 600 undergoes an ion exchange process to create the equi-convex lens array 600 (see FIG. 6G). A typical ion exchange step 510 could be performed by immersing the polished lens array 600 for a predetermined amount of time in a $KNO_3$ molten salt bath at 500° C. As shown in FIGS. 6F and 6G, the lens array 600 includes an array of useful equi-convex lens 614 that are formed in predetermined glass regions 608. As can be seen, the ion exchange step 510 produces useful lenses 614 on both sides 610 and 612 which where polished flat in the polishing step 508 (see FIG. 6D). The useful lenses 614 on side 610 and are going to be the same height as the useful lenses 614 on side 612 (compare to the bi-convex lenses 414 in FIG. 4G).

The lens array 600 also includes an additional glass region 608 shown as glass region 624 which is not one of the useful lenses 614. The glass region 624 is located within an opal border 626 and outside the opal region 606 surrounding the useful lenses 614. The opal border 626 is shown as a frame around the lens array 600. The addition of the glass region 624 and the opal border 626 helps minimize the warpage of the lens array 600 (see FIG. 6G). Otherwise, the lens array 600 without the glass region 624 would likely warp after the ion exchange step 510 (compare to traditional lens array 200 in FIGS. 2A–2B).

A traditional equi-convex lens array (not shown) would warp but not as much as the traditional bi-convex lens array 220 (see FIG. 2) because the structural stresses are the same after polishing both sides of the traditional equi-convex lens array 220. However, since the equi-convex lens array 600 of the present has the glass region 624 and the opal border 626 there is very little if any structural stress created during the polishing step 508 and as such there is very little if any warpage of the lens array 600 caused during the ion exchange step 510.

Referring to FIGS. 7 and 8A–8G, there are respectively illustrated a flowchart of the preferred method 700 for making a plano-convex lens array 800 and various cross-sectional side views and top views of plano-convex lens array 800 at different steps in the preferred method 700. To avoid repetition, some of the details about the preferred photosensitive glass plate and how this plate can be used to make the plano-convex lens array 800 are not described in detail below since they are the same as described above with respect to the bi-convex lens array 400.

Figure 8A:
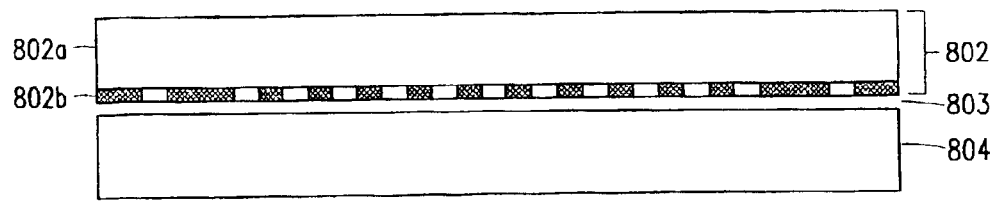
FIGS. 8A–8G illustrates cross-sectional side views and top views of the piano-convex lens array at different steps in the method shown in FIG. 7.

Beginning at step 702, a photomask 802 is placed in contact with a photosensitive glass plate 804 (see FIG. 8A). The contact can be an air interface 803 between the photomask 802 and the photosensitive glass plate 804. Instead of having the air interface 803, an oil closely matching the index of glass such as glycerin can be used as a medium between the photomask 802 and the photosensitive glass plate 804 to help eliminate the air gap 803 and the resulting reflection and/or scattering of light that can result from the air gap 803.

Figure 8B:
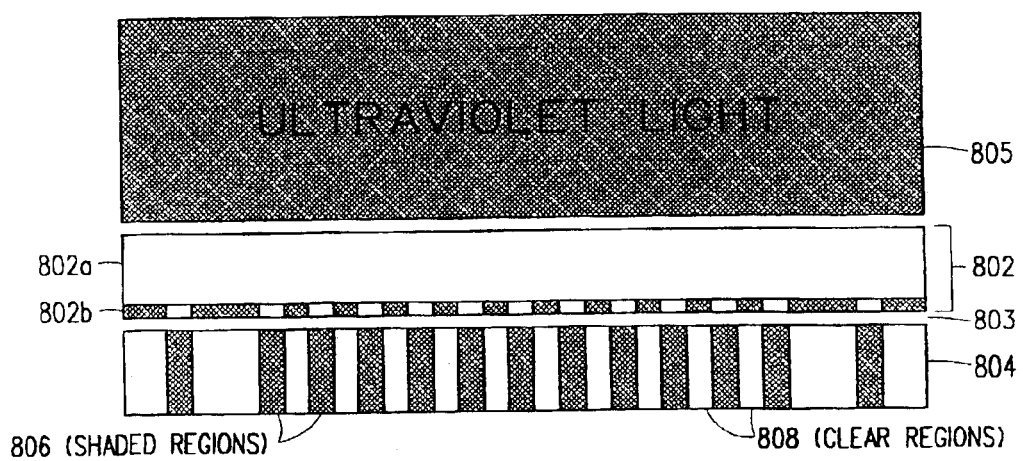
Figure 8C:
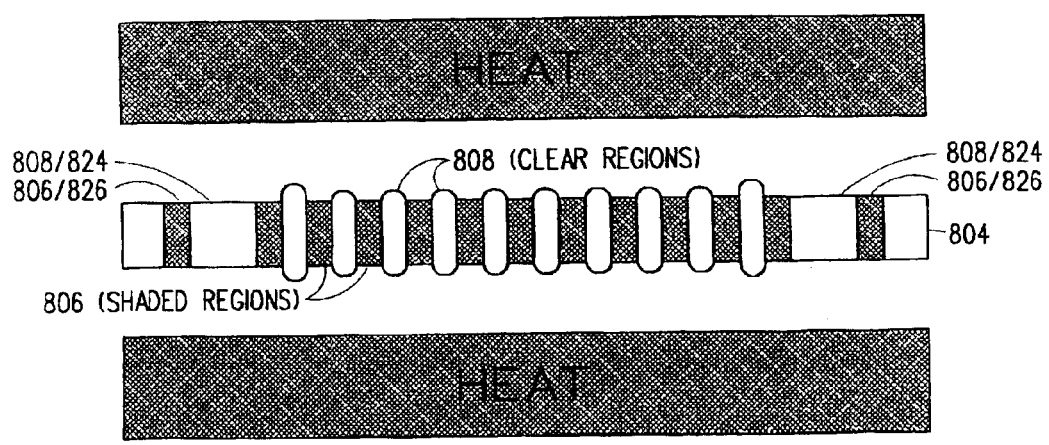

At step 704, the photomask 802 and selected regions of the photosensitive glass plate 804 are exposed to an ultraviolet light 805 (see FIG. 8B). Like the aforementioned photomask 402, the photomask 802 is a chrome-on-quartz photomask 802 that includes a quartz substrate 802a and a chromium layer 802b. The chrome in the chromium layer 802b of the photomask 802 is absent where opal regions 806 (shown as shaded regions) are desired in the photosensitive glass plate 804. And, the chrome in the chromium layer 802b of the photomask 802 is present where glass regions 808 (shown as clear regions) are desired in the photosensitive glass plate 804.

The exposure step 704 can be performed by any method that is capable of producing an ultraviolet light with sufficient energy to nucleate the opal phase (future opal regions 806) in the photosensitive glass plate 804 and with sufficient collimation so that the exposure is well defined through the photosensitive glass plate 804. After the exposure step 704, the photomask 802 is separated from the exposed photosensitive glass plate 804. If needed, the exposed photosensitive glass plate 804 is washed with soap and water to remove dust, contaminants, residue etc. . . .

At step 706, the exposed photosensitive glass plate 804 is heated to form therein the opal regions 806 (shown as shaded regions) and the glass regions 808 (shown as clear regions). Like the aforementioned heat treatment step 406, the heat treatment step 706 is done in a furnace with the exposed photosensitive glass plate 804 placed in a covered stainless steel box with flowing dry nitrogen. During the heating step 706, the opal regions 806 shrink considerably more than the glass regions 808 in the photosensitive glass plate 804 (see FIG. 8C). After completing steps 702, 704 and 706, the heated photosensitive glass plate 804 resembles a thermally produced lens array 800 which is basically a glass composite plate.

Figure 8D:
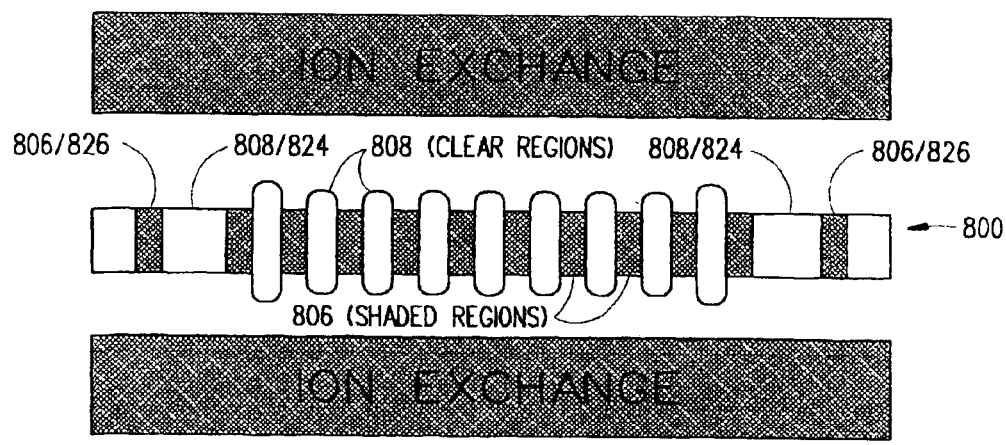

At step 708, the heated lens array 800 undergoes an ion exchange process to create an ion exchanged lens array 800 (see FIG. 8D). A typical ion exchange step 708 could be performed by immersing the heated lens array 800 for a predetermined amount of time in a $KNO_3$ molten salt bath at 700° C. As can be seen in FIG. 8D, the ion exchange step 708 produces useful lenses 814 on both sides 810 and 812. The optical properties of the array of useful lens 814 are enhanced by the ion exchange step 708 which generates additional sag on the thermally produced lenses 814.

Figure 8E:
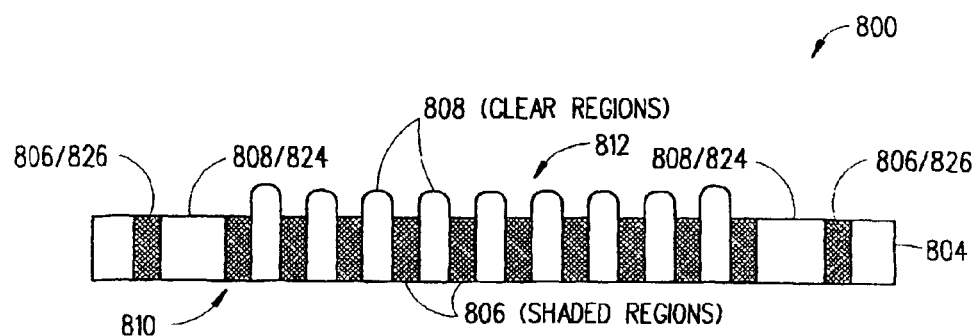

At step 710, the side 810 of the ion exchanged lens array 800 that was placed on the furnace or former during the heat treatment step 706 is polished (see FIG. 8E). This effectively turns the ion exchanged lens array 800 into a plan-convex lens array 800. The lenses 814 on side 810 are polished smooth because they are more likely to become "damaged" or "deformed" when they contact the furnace or the former during the heat treatment step 706.

Figure 8F:
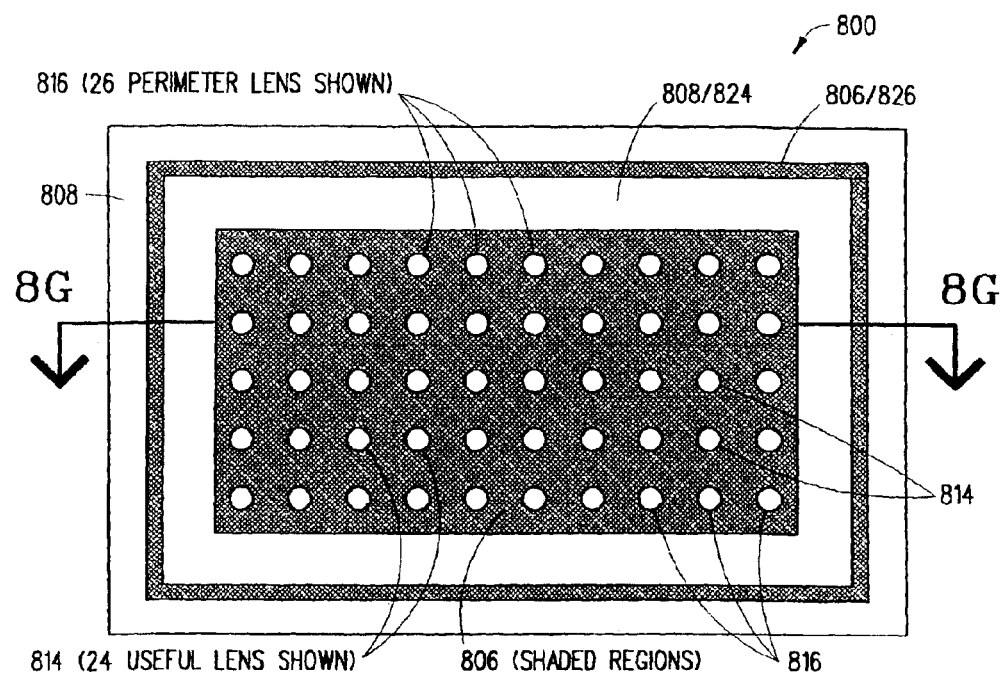
Figure 8G:
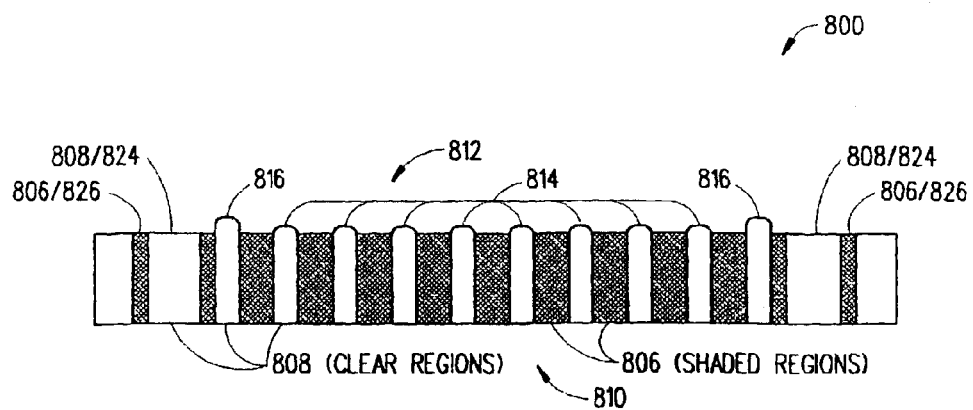

The plano-convex lens array 800 also includes a series of perimeter lens 816 that surround the useful plano-convex lenses 814 (see FIGS. 8F and 8G). The perimeter lenses 816 are formed in predetermined glass regions 808 but are not used in the lens array 800 to collimate light from optical fibers (not shown). The addition of the perimeter lenses 816 indirectly enhances the optical properties of the useful lenses 814 by helping to maintain relatively uniform sag heights across the useful piano-convex lenses 814. In particular, without the perimeter lenses 816, the outer useful lenses 814 would have higher sag heights than the inner useful lenses 814. Again, the difference in sag heights is one of the problems with the traditional lens array 220 where the outer lenses 220a and 220h are higher than the inner lenses 220b–220g (see FIGS. 2A–2B). As can be seen in FIG. 8G, the perimeter lenses 816 have higher sag heights than the useful lenses 814 and all of the useful lenses 814 have uniform sag heights.

In the event, the lens array 800 had only one row of useful lens 814 instead of a two-dimensional array of useful lens 814, then two sacrificial lenses could be added at each end of the row of the useful lenses 814. In other words, a one-dimensional lens array would not need perimeter lenses 816 but instead would have two sacrificial lenses at each end of the row of useful lenses 814. The sacrificial lenses like the perimeter lenses 816 would help maintain relatively uniform sag heights across the useful lenses 814. This situation is described in greater detail below with respect to lens array 1400, 1700 and 1800 (see FIGS. 14–16).

The lens array 800 also includes an additional glass region 808 shown as glass region 824 which is not one of the useful lenses 814 or perimeter lenses 816. The glass region 824 is located within an opal border 826 and outside the opal region 806 surrounding the useful lenses 814 and the perimeter lenses 816. The opal border 826 is shown as a frame around the lens array 800. The addition of the glass region 824 and the opal border 826 helps minimize the warpage of the lens array 800 (see FIG. 8G). Otherwise, the lens array 800 without the glass region 824 would likely warp after the ion exchange step 708 (compare to traditional lens array 200 in FIGS. 2A–2B).

A traditional plano-convex lens array (not shown) would warp but not as much as the traditional bi-convex lens array 220 (see FIG. 2). Because, the traditional plano-convex lens array has structural stresses that are induced during the polishing step 710 that would not be relieved since there is no subsequent heat treatment. And, since the structural stresses are not relieved in the traditional plano-convex lens array, the traditional plano-convex lens array would not warp as much as the traditional bi-convex lens array 220. However, the plano-convex lens array 800 of the present invention is even less likely to warp than the traditional plano-convex lens array. Because, the plano-convex lens array 800 has the glass region 824 and the opal border 826 which help to dissipate any structural stresses that are created during the polishing step 710.

Referring to FIGS. 9–18, there are illustrated different embodiments of the lens array 900, 1000 . . . 1800 in accordance with the present invention. Basically, each lens array 900, 1000 . . . 1800 (shown as a bi-convex lens array) can be fabricated using any of the methods 300, 500 and 700 but would have a photomask that has a different configuration than the photomask 402, 602 and 702 used to make lens array 400, 600 and 700. It should be understood that in addition to the lens arrays 900, 1000 . . . 1800 described herein it is possible to design and fabricate in accordance with the present invention many different types of lens arrays that have different configurations than lens arrays 900, 1000 . . . 1800.

Figure 9A:
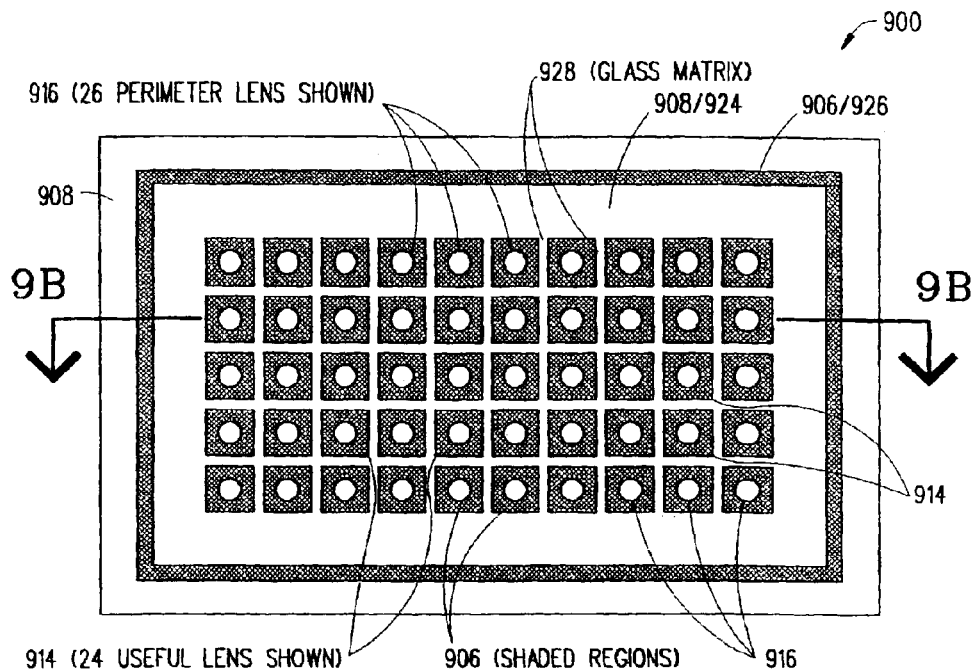
FIGS. 9A–9B respectively illustrates a top view and a cross-sectional side view of another embodiment of the lens array in accordance with the present invention.
Figure 9B:
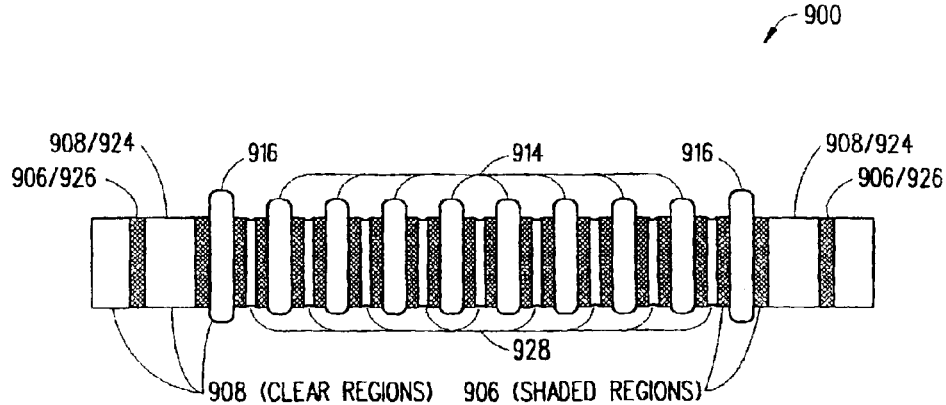

Referring to FIGS. 9A–9B, there are respectively illustrated a top view and a cross-sectional side view of lens array 900 (shown in this example as a 5×10 lens array). The configuration of lens array 900 is similar to lens array 400, 600 and 800 except that there are glass regions 908 (shown as glass matrix 928) and separate opal regions 906 surrounding each of the perimeter lenses 916 and useful lenses 914. Each of the separate opal regions 906 has a square perimeter.

As illustrated, the lens array 900 includes the opal border 926, the glass region 924, the separate opal regions 906, the glass matrix 928, the perimeter lenses 916 and the useful lenses 914. It is believed that warpage is prevented and the pitch maintained, because as the exposed glass regions 908, 924 and 928 are crystallized during the heat treatment they densify and shrink. As this happens, the glass matrix 928 that separates each glass/ceramic enclosed lens 914 and 916 flows to allow for stress relief. Of course, the glass matrix 928 becomes thinner than the lenses 914 and 916 and the glass/ceramic regions 906. Again, the addition of perimeter lenses 916 helps to maintain relatively uniform sag heights across the useful lenses 914.

Figure 10A:
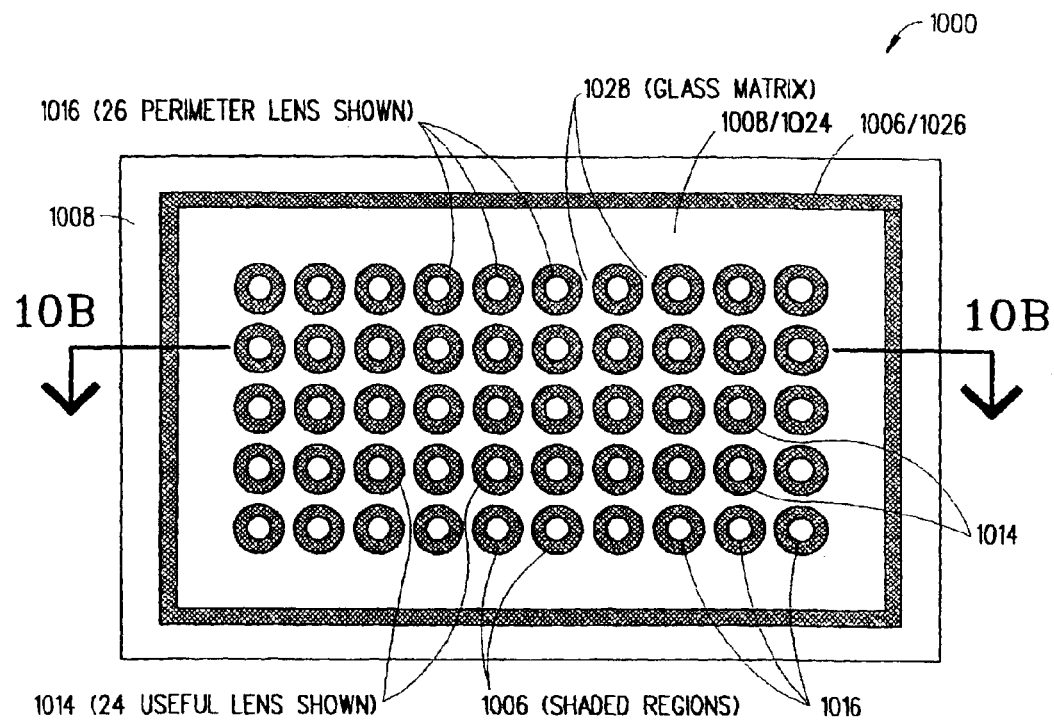
FIGS. 10A–10B respectively illustrates a top view and a cross-sectional side view of another embodiment of the lens array in accordance with the present invention.
Figure 10B:
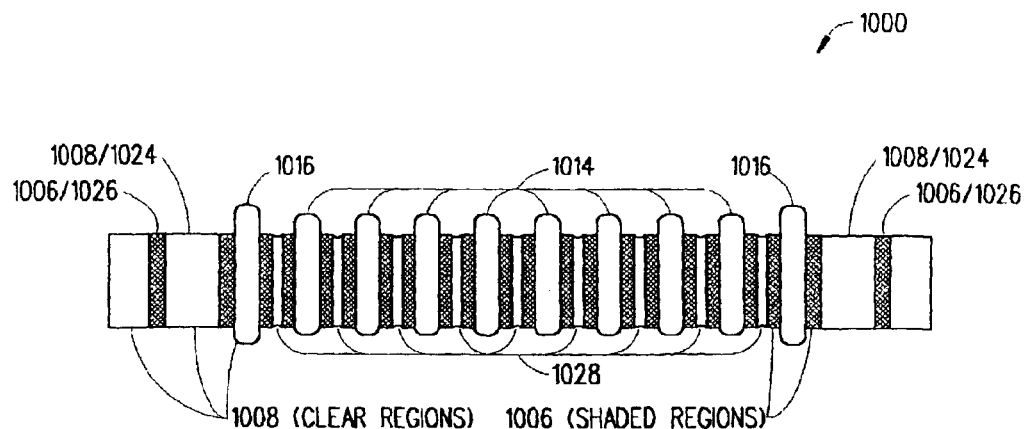

Referring to FIGS. 10A–10B, there are respectively illustrated a top view and a cross-sectional side view of lens array 1000 (shown in this example as a 5×10 lens array). The configuration of lens array 1000 is similar to lens array 400, 600 and 800 except that there are glass regions 1008 (shown as glass matrix 1028) and separate opal regions 1006 surrounding each of the perimeter lenses 1016 and useful lenses 1014. Each of the separate opal regions 1006 has a circular perimeter. The circular perimeter of the opal regions 1006 is expected to improve the uniform curvature of the useful lenses 1014.

As illustrated, the lens array 1000 includes the opal border 1026, the glass region 1024, the separate opal regions 1006, the glass matrix 1028, the perimeter lenses 1016 and the useful lenses 1014. It is believed that warpage is prevented and the pitch maintained, because as the exposed glass regions 1008, 1024 and 1028 are crystallized during the heat treatment they densify and shrink. As this happens, the glass matrix 1028 that separates each glass/ceramic enclosed lens 1014 and 1016 flows to allow for stress relief. Of course, the glass matrix 1028 becomes thinner than the lenses 1014 and 1016 and the glass/ceramic regions 1006. Again, the addition of perimeter lenses 1016 helps to maintain relatively uniform sag heights across the useful lenses 1014.

Figure 11A:
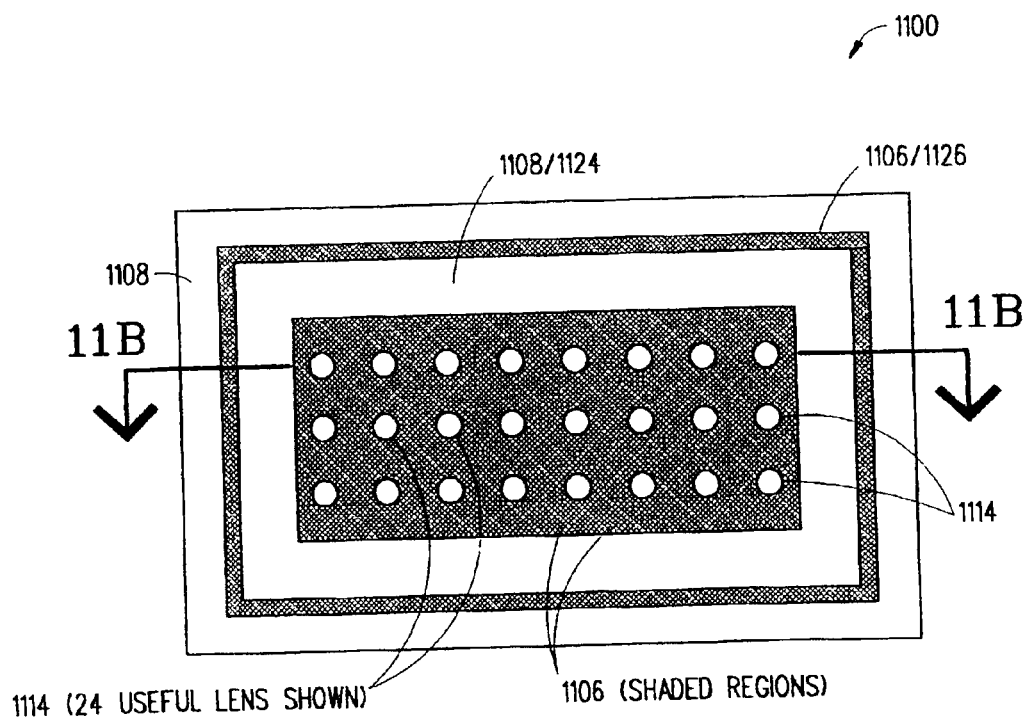
FIGS. 11A–11B respectively illustrates a top view and a cross-sectional side view of another embodiment of the lens array in accordance with the present invention.
Figure 11B:
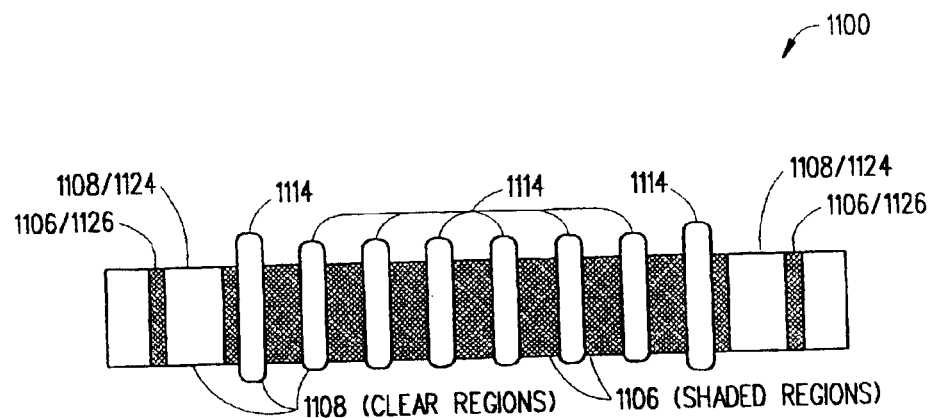

Referring to FIGS. 11A–11B, there are respectively illustrated a top view and a cross-sectional side view of lens array 1100 (shown in this example as a 3×8 lens array). The configuration of lens array 1100 is similar to lens array 400, 600 and 800 except that there are no perimeter lenses located around the useful lenses 1114. As illustrated, the lens array 1100 includes the opal border 1126, the glass region 1124, the opal region 1106 and the useful lenses 1114. It is believed that by reducing the area of the opal region 1106 surrounding the useful lenses 1114 that the stresses are reduced on the useful lenses 1114 in a manner that helps maintain relatively uniform sag heights across the useful lenses 1114 without needing the perimeter lenses.

Figure 12A:
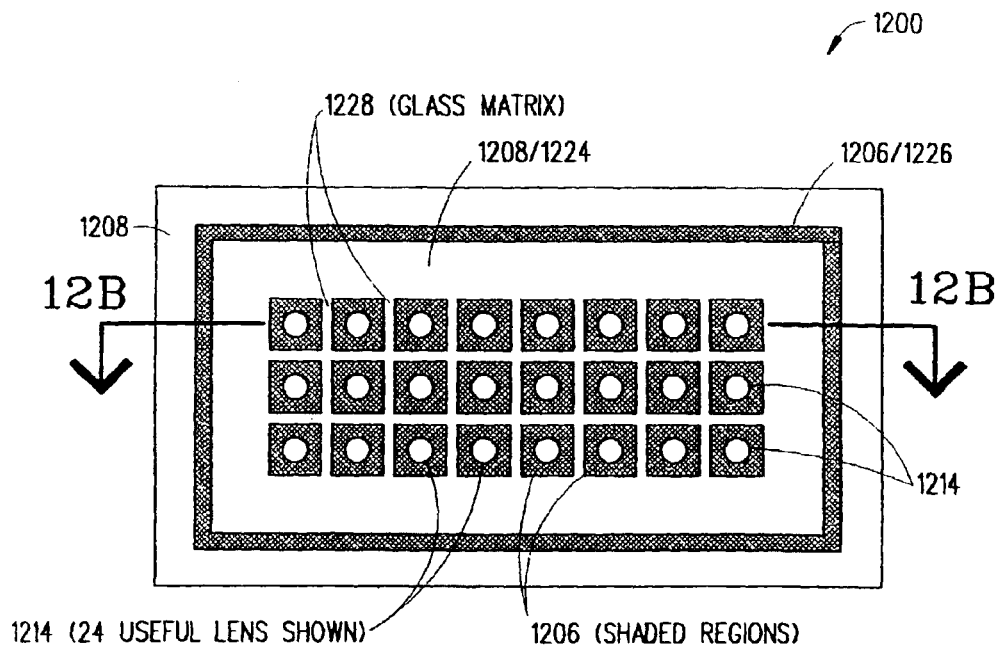
FIGS. 12A–12B respectively illustrates a top view and a cross-sectional side view of another embodiment of the lens array in accordance with the present invention.
Figure 12B:
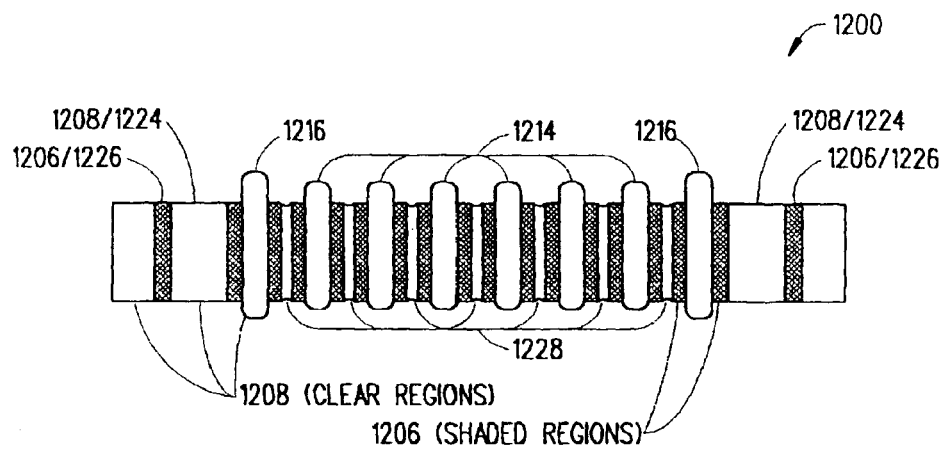

Referring to FIGS. 12A–12B, there are respectively illustrated a top view and a cross-sectional side view of lens array 1200 (shown in this example as a 3×8 lens array). The configuration of lens array 1200 is similar to lens array 400, 600 and 800 except that there are no perimeter lenses located around the useful lenses 1214 and there are glass regions 1208 (shown as glass matrix 1228) and separate opal regions 1206 surrounding each of the useful lenses 1214. Each of the separate opal regions 1206 has a square perimeter.

As illustrated, the lens array 1200 includes the opal border 1226, the glass region 1224, the separate opal regions 1206, the glass matrix 1228 and the useful lenses 1214. It is believed that warpage is prevented and the pitch maintained, because as the exposed glass regions 1208, 1224 and 1228 are crystallized during the heat treatment they densify and shrink. As this happens, the glass matrix 1228 that separates each glass/ceramic enclosed lens 1214 flows to allow for stress relief. Of course, the glass matrix 1228 becomes thinner than the lenses 1214 and the glass/ceramic regions 1206. It is also believed that by reducing the area of the separate opal regions 1206 surrounding the useful lenses 1214 that the stresses are reduced on the useful lenses 1214 in a manner that helps maintain a relatively uniform sag heights across the useful lenses 1214 without needing the perimeter lenses.

Figure 13A:
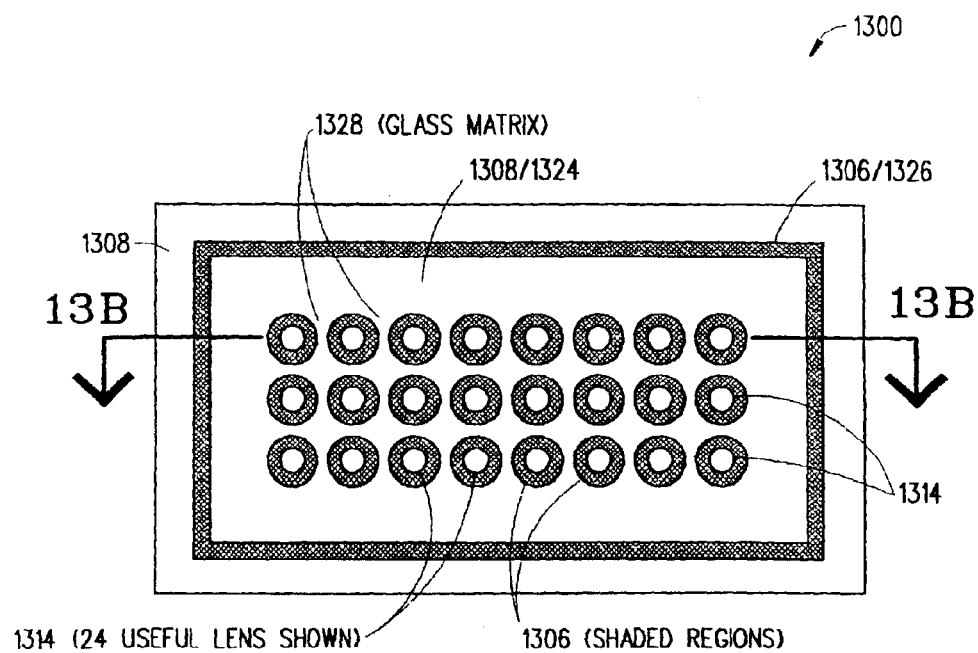
FIGS. 13A–13B respectively illustrates a top view and a cross-sectional side view of another embodiment of the lens array in accordance with the present invention.
Figure 13B:
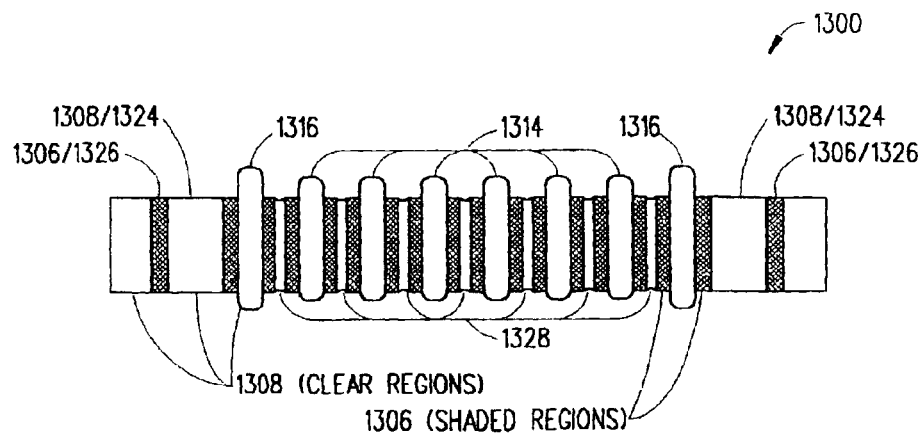

Referring to FIGS. 13A–13B, there are respectively illustrated a top view and a cross-sectional side view of lens array 1300 (shown in this example as a 3×8 lens array). The configuration of lens array 1300 is similar to lens array 400, 600 and 800 except that there are no perimeter lenses located around the useful lenses 1314 and there are glass regions 1308 (shown as glass matrix 1328) and separate opal regions 1306 surrounding each of the useful lenses 1314. Each of the separate opal regions 1306 has a circular perimeter. The circular perimeter of the separate opal regions 1306 is expected to improve the uniform curvature of the useful lenses 1314.

As illustrated, the lens array 1300 includes the opal border 1326, the glass region 1324, the separate opal regions 1306, the glass matrix 1328 and the useful lenses 1314. It is believed that warpage is prevented and the pitch maintained, because as the exposed glass regions 1308, 1324 and 1328 are crystallized during the heat treatment they densify and shrink. As this happens, the glass matrix 1328 that separates each glass/ceramic enclosed lens 1314 flows to allow for stress relief. Of course, the glass matrix 1328 becomes thinner than the lenses 1314 and the glass/ceramic regions 1306. It is also believed that by reducing the area of the separate opal regions 1306 surrounding the useful lenses 1314 that the stresses are reduced on the useful lenses 1314 in a manner that helps maintain relatively uniform sag heights across the useful lenses 1314 without needing the perimeter lenses.

Figure 14A:
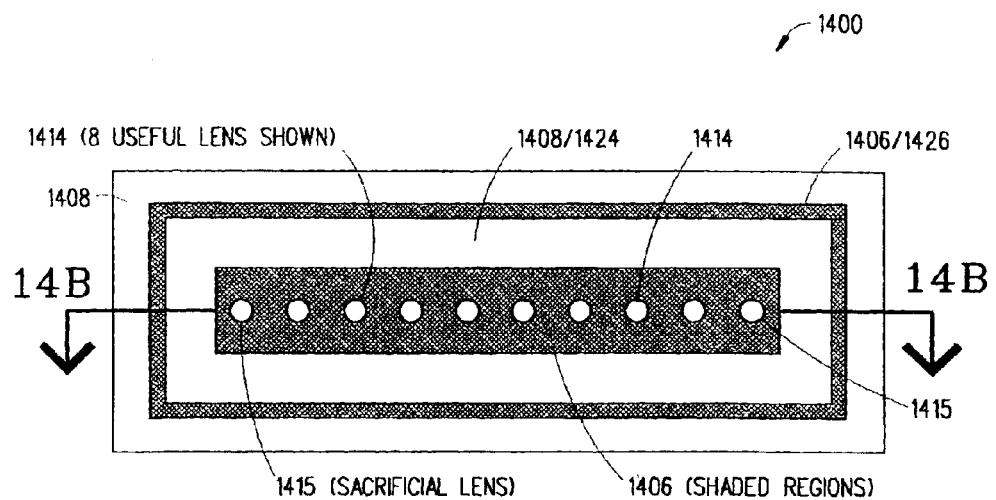
FIGS. 14A–14B respectively illustrates a top view and a cross-sectional side view of another embodiment of the lens array in accordance with the present invention.
Figure 14B:
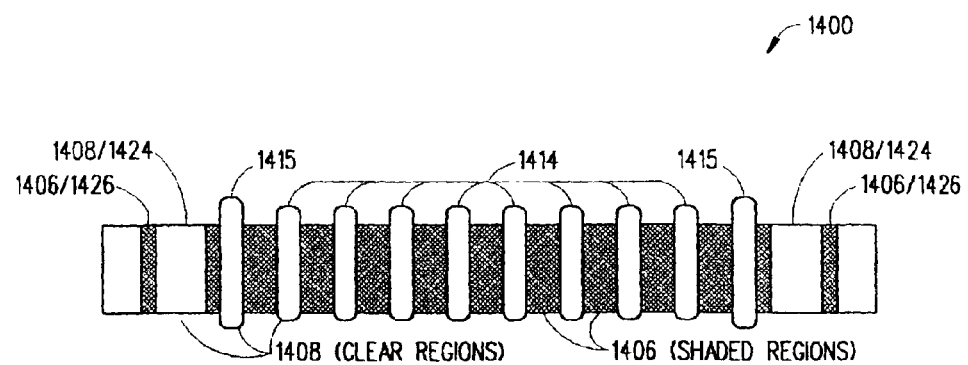

Referring to FIGS. 14A–14B, there are respectively illustrated a top view and a cross-sectional side view of lens array 1400 (shown in this example as a 1×10 lens array). The configuration of the one-dimensional lens array 1400 is similar to lens array 400, 600 and 800 except that instead of a two-dimensional array of lenses 414 and 416 there is one row of useful lenses 1414 and two sacrificial lenses 1415. Like the perimeter lenses 416, the sacrificial lenses 1415 help ensure that the useful lenses 1414 have relatively uniform sag heights. As illustrated, the lens array 1400 includes the opal border 1426, the glass region 1424, the opal region 1406, the sacrificial lenses 1415 and the useful lenses 1414.

Figure 15A:
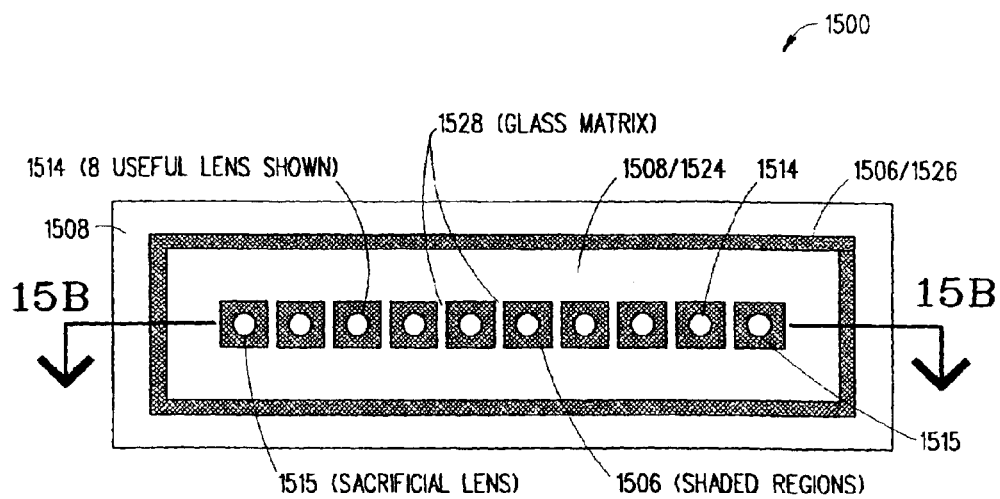
FIGS. 15A–15B respectively illustrates a top view and a cross-sectional side view of another embodiment of the lens array in accordance with the present invention.
Figure 15B:
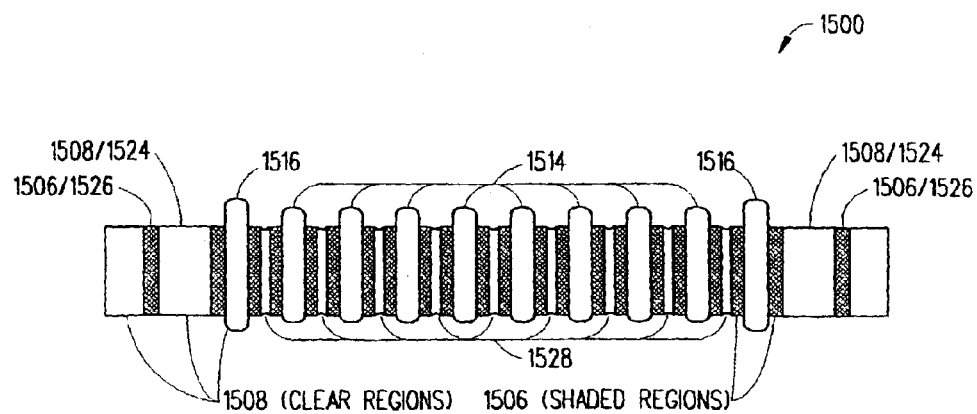

Referring to FIGS. 15A–15B, there are respectively illustrated a top view and a cross-sectional side view of lens array 1500 (shown in this example as a 1×10 lens array). The configuration of the one-dimensional lens array 1500 is similar to lens array 400, 600 and 800 except that instead of a two-dimensional array of lenses 414 and 416 there is one row of useful lenses 1514 and two sacrificial lenses 1515. Moreover, the lens array 1500 is different than lens array 400 because it has separate glass regions 1506 (glass matrix 1528) and separate opal regions 1506 surrounding each of the sacrificial lenses 1515 and useful lenses 1514. Each of the separate opal regions 1506 has a square perimeter.

As illustrated, the lens array 1500 includes the opal border 1526, the glass region 1524, the separate opal regions 1506, the sacrificial lenses 1515 and the useful lenses 1514. It is believed that warpage is prevented and the pitch maintained, because as the exposed glass regions 1508, 1524 and 1528 are crystallized during the heat treatment they densify and shrink. As this happens, the glass matrix 1528 that separates each glass/ceramic enclosed lens 1514 flows to allow for stress relief. Of course, the glass matrix 1528 becomes thinner than the lenses 1514 and 1515 and the glass/ceramic regions 1506. The addition of sacrificial lenses 1515 helps to maintain relatively uniform sag heights across the useful lenses 1514.

Figure 16A:
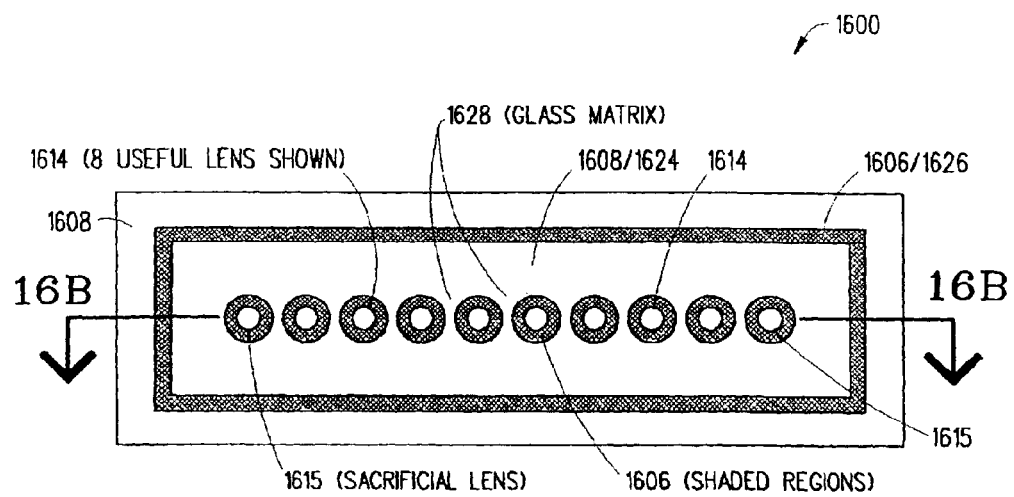
FIGS. 16A–16B respectively illustrates a top view and a cross-sectional side view of another embodiment of the lens array in accordance with the present invention.
Figure 16B:
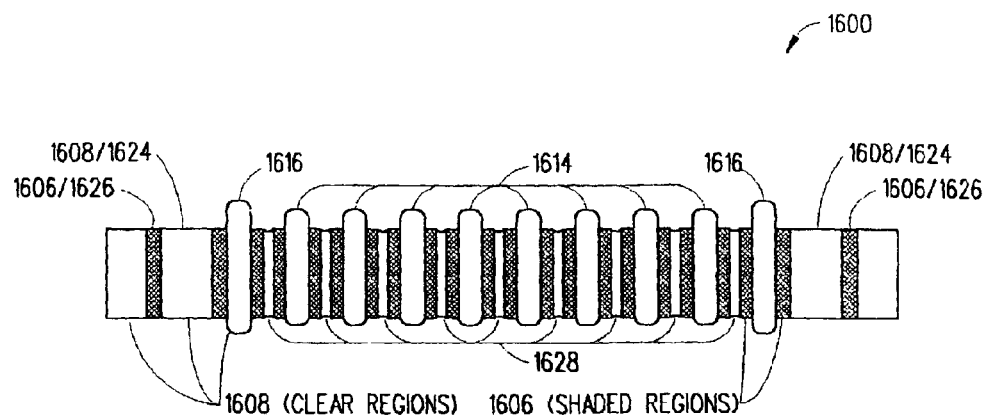

Referring to FIGS. 16A–16B, there are respectively illustrated a top view and a cross-sectional side view of lens array 1600 (shown in this example as a 1×10 lens array). The configuration of the one-dimensional lens array 1600 is similar to lens array 400, 600 and 800 except that instead of a two-dimensional array of lenses 414 and 416 there is one row of useful lenses 1614 and two sacrificial lenses 1615. Moreover, the lens array 1100 is different that lens array 400 because it has separate glass regions 1606 (glass matrix 1628) and separate opal regions 1606 surrounding each of the sacrificial lenses 1615 and useful lenses 1614. Each of the separate opal regions 1606 has a circular perimeter. The circular perimeter of the separate opal regions 1606 is expected to improve the uniform curvature of the useful lenses 1614.

As illustrated, the lens array 1600 includes the opal border 1626, the glass region 1624, the separate opal regions 1606, the glass matrix 1628, the sacrificial lenses 1615 and the useful lenses 1614. It is believed that warpage is prevented and the pitch maintained, because as the exposed glass regions 1608, 1624 and 1628 are crystallized during the heat treatment they densify and shrink. As this happens, the glass matrix 1628 that separates each glass/ceramic enclosed lens 1614 flows to allow for stress relief. Of course, the glass matrix 1628 becomes thinner than the lenses 1614 and 1615 and the glass/ceramic regions 1606. The addition of sacrificial lenses 1615 helps to maintain relatively uniform sag heights across the useful lenses 1614.

It should be understood that the glass matrix 928, 1028, 1228, 1328, 1528 and 1628 described above with respect to FIGS. 9–10, 12–13 and 15–16 helps to maintain the proper pitch or distance between the lenses rather than preventing the warpage of the lens array 900, 1000, 1200, 1300, 1500 and 1600 during the thermal treatment more so than the ion exchange treatment. If the lens array 900, 1000, 1200, 1300, 1500 and 1600 did not have the glass matrix 928, 1028, 1228, 1328, 1528 and 1628, then the lenses along the array edge could move further with shrinkage than those lenses in the middle of the lens array 900, 1000, 1200, 1300, 1500 and 1600. In addition, the glass matrix 928, 1028, 1228, 1328, 1528 and 1628 helps prevent the drastic shrinkage that could occur in an N×M lens array where N and M have significantly large values (e.g., 22×18 lens array). In the preferred embodiment, the thickness of the glass matrix 928, 1028, 1228, 1328, 1528 and 1628 and the thickness of the separate opal regions 906, 1006, 1206, 1306, 1506 and 1606 can each be in the range of 5–50 microns. However, the thickness of the and the thickness of the separate opal regions 906, 1006, 1206, 1306, 1506 and 1606 can be more or less than 5–50 microns depending on the application.

Figure 17A:
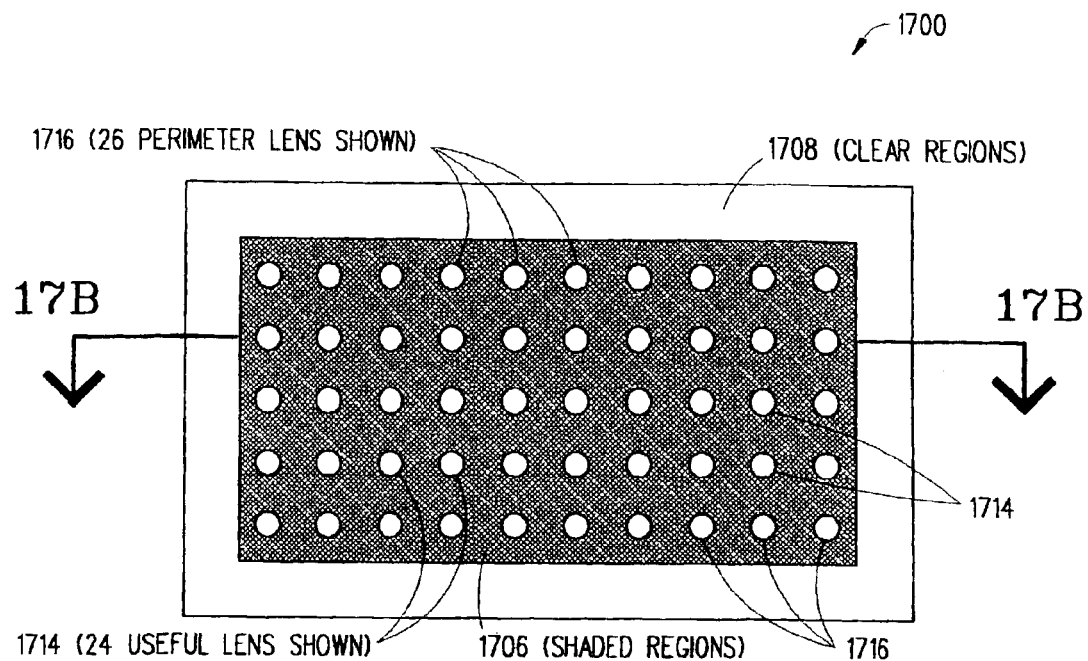
FIGS. 17A–17B respectively illustrates a top view and a cross-sectional side view of another embodiment of the lens array in accordance with the present invention.
Figure 17B:
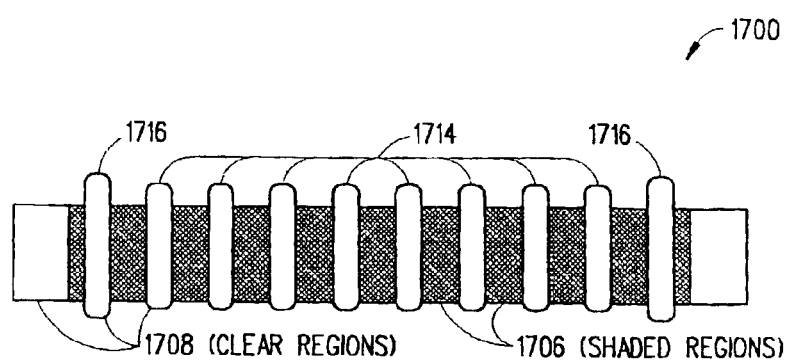

Referring to FIGS. 17A–17B, there are respectively illustrated a top view and a cross-sectional side view of lens array 1700 (shown in this example as a 5×10 lens array). The configuration of lens array 1700 is similar to lens array 400 except that there is no glass region similar to glass region 426 in lens array 400. The lens array 1700 is likely to warp since there is no glass region to help relieve the stress caused by the opal region 1706 during the ion exchange step 310. However, the addition of perimeter lenses 1716 helps to maintain relatively uniform sag heights across the useful lenses 1714. Thus, the addition of perimeter lenses 1716 addresses one of the main problems with traditional lens array 200 and may be acceptable for many photonic applications even though the lens array 1700 may be a little warped. As illustrated, the lens array 1700 includes the opal region 1706, the perimeter lenses 1716 and the useful lenses 1714.

Figure 18A:
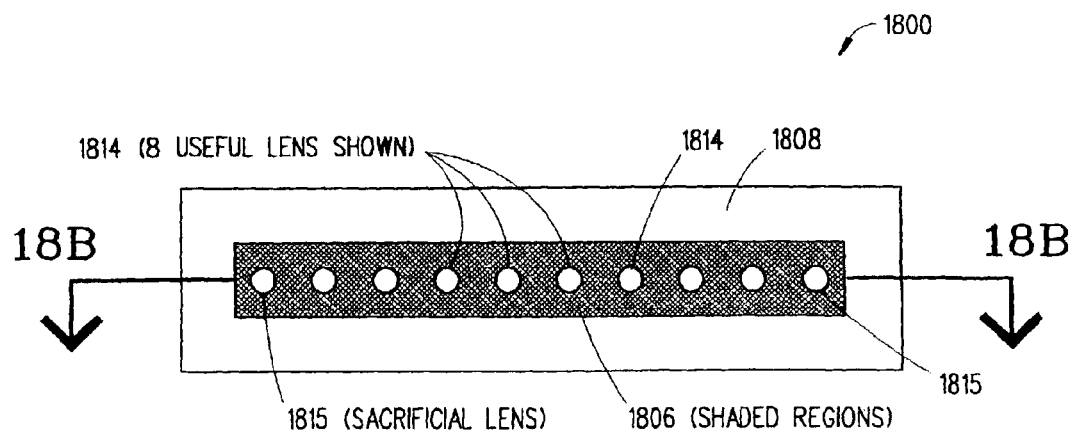
FIGS. 18A–18B respectively illustrates a top view and a cross-sectional side view of another embodiment of the lens array in accordance with the present invention.
Figure 18B:
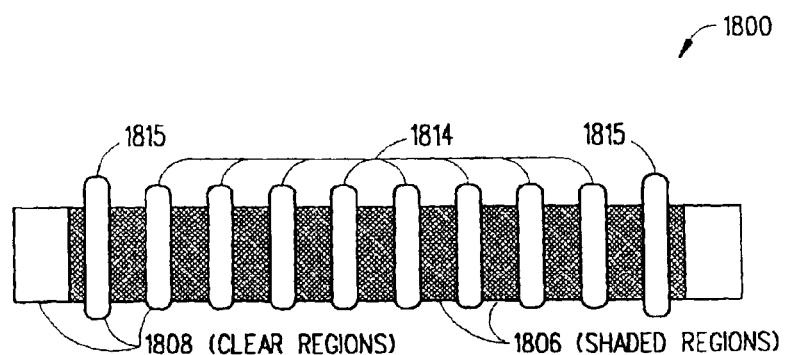

Referring to FIGS. 18A–18B, there are respectively illustrated a top view and a cross-sectional side view of lens array 1800 (shown in this example as a 1×10 lens array). The configuration of the lens array 1800 is similar to lens array 400 except that instead of a two-dimensional array of lenses 418 and 416 there is one row of useful lenses 1818 and two sacrificial lenses 1815. In addition, lens array 1800 differs from lens array 400 in that there is no glass region similar to glass region 426 in lens array 400. The lens array 1800 is likely to warp since there is no glass region to help relieve the stress caused by the opal region 1806 during the ion exchange step 310. However, the addition of the two sacrificial lenses 1815 helps to maintain relatively uniform sag heights across the useful lenses 1818. Thus, the addition of sacrificial lenses 1815 helps address one of the main problems with traditional lens array 200 and may be acceptable for many photonic applications even though the lens array 1800 may be little warped. As illustrated, the lens array 1800 includes the opal region 1806, the sacrificial lenses 1815 and the useful lenses 1818.

It should be understood that the lens array 400, 600, 800, 900 . . . 1800 can be coupled to a fiber array to form a collimator array that can be used to perform a variety of signal processing operations including multiplexing, switching, filtering, polarizing and demultiplexing. Following is a brief list of some of other photonic applications that can use a collimator array:

Laser diode arrays.

Optical Interconnects.

Contact-image sensors.

Light emitting diode arrays.

Liquid crystal display projection systems.

Direct mount lens array to a charge coupled device.

2-D and 3-D optical switches.

Although several embodiments of the present invention has been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:

1. A lens array, comprising:
a glass composite plate including a one-dimensional array of useful lenses formed therein, said glass composite plate further includes a plurality of sacrificial lenses each of which is formed next to an end of a row of the useful lenses, wherein said sacrificial lenses help maintain relatively uniform sag heights across the one-dimensional array of useful lenses; and
said glass composite plate further includes a glass region and a glass matrix located within an opal border of said glass composite plate and outside at least one opal region of said glass composite plate that surrounds each useful lenses.

2. A lens array, comprising:
a glass composite plate including a two-dimensional array of useful lenses formed therein, said glass composite plate further includes a plurality of perimeter lenses each of which is formed next to an end of a row or column of the useful lenses, wherein said perimeter lenses help maintain relatively uniform sag heights across the two-dimensional array of useful lenses; and
said glass composite plate further includes a glass region and a glass matrix located within an opal border of said glass composite plate and outside at least one opal region of said glass composite plate that surrounds each of the useful lenses.

3. A lens array comprising:
a glass composite plate including an array of useful lenses formed therein, said glass composite plate further includes a glass region and a glass matrix located within an opal border of said glass composite plate and outside at least one opal region of said glass composite plate that surrounds each of the useful lenses, wherein said at least one glass region and said opal border help minimize warpage of said glass composite plate.

4. The lens array of claim 3, wherein said glass composite plate further includes a plurality of sacrificial lenses each of which is formed next to an end of a row of the useful lenses.

5. The lens array of claim 3, wherein said glass composite plate further includes a plurality of perimeter lenses each of which is formed next to an end of a row of a column of the useful lenses.

6. A lens array comprising:
a glass composite plate including a one-dimensional array of useful lenses formed therein, said glass composite further including a plurality of sacrificial lenses, each of which is formed next to an end of a row of the useful lenses, wherein said glass composite plate further includes a glass region located within an opal border and located outside an opal region that surrounds the useful lenses and the sacrificial lenses.

7. The lens array of claim 6, wherein said glass region further includes a glass matrix located outside individual opal regions surrounding each of the useful lenses and the sacrificial lenses.

8. The lens array of claim 6, wherein:
said plurality of sacrificial lens help maintain relatively uniform sag heights across the one-dimensional array of useful lens; and
said glass region and said opal border help minimize warpage of said glass composite plate.

9. The lens array of claim 6, wherein each useful lens is a bi-convex lens, an equi-convex lens or a plano-convex lens.

10. The lens array of claim 6, wherein said glass composite plate is aligned with and mounted to a fiber array to form a collimator array.

11. A lens array comprising:
a glass composite plate including a two-dimensional array of useful lens formed therein, said glass composite plate further including a plurality of perimeter sacrificial lenses, each of which is formed next to an end of a row or a column of the useful lenses, wherein said glass composite plate further includes a glass region located within an opal border and located outside an opal region that surrounds the useful lenses and the perimeter sacrificial lenses.

12. The lens array of claim 11, wherein said glass region further includes a glass matrix located outside individual opal regions surrounding each of the useful lenses and the perimeter sacrificial lenses.

13. The lens array of claim 11, wherein:
said plurality of perimeter sacrificial lens help maintain relatively uniform sag heights across the two-dimensional array of useful lenses; and
said glass region and said opal border help minimize warpage of said glass composite plate.

14. The lens array of claim 11, wherein each useful lens is a bi-convex, an equi-convex lens, or a plano-convex lens.

15. The lens array of claim 11, wherein said glass composite plate is aligned with and mounted to a fiber array to form a collimator array.

16. A lens array comprising:
a glass composite plate including an array of useful lenses formed therein,
said glass composite plate further includes a glass region located within an opal border located outside an opal region that surrounds the useful lenses.

17. The lens array of claim 16, wherein said glass region further includes a glass matrix located outside individual opal regions surrounding each of the useful lenses.

18. The lens array of claim 16, wherein said glass composite plate further includes a plurality of sacrificial lenses each of which is formed next to an end of a row of the useful lenses.

19. The lens array of claim 16, wherein said glass composite plate further includes a plurality of perimeter sacrificial lenses each of which is formed next to an end of a row or a column of the useful lenses.

20. The lens array of claim 16, wherein each useful lens is a bi-convex lens, an equi-convex lens, or a plano-convex lens.

21. The lens array of claim 16, wherein said glass composite plate is aligned with and mounted to a fiber array to form a collimator array.

* * * * *